United States Patent
Shin et al.

(10) Patent No.: US 9,568,584 B2
(45) Date of Patent: Feb. 14, 2017

(54) WIRELESS POSITIONING SERVER USING CLOCK OFFSET CALIBRATION POSITIONING METHOD USING THE SAME

(71) Applicants: SOONGSIL UNIVERSITY RESEARCH CONSORTIUM TECHNO-PARK, Seoul (KR); KOREA ELECTROTECHNOLOGY RESEARCH INSTITUTE, Changwon-si, Gyeongsangnam-do (KR)

(72) Inventors: Yo An Shin, Seoul (KR); Won Cheol Lee, Seoul (KR); Hyung Min Chang, Seoul (KR); E Rang Lim, Seoul (KR); Ji Myung Kang, Suwon-si (KR); Soon Woo Lee, Suwon-si (KR); Young Jin Park, Anyang-si (KR); Kwan Ho Kim, Seoul (KR)

(73) Assignees: SOONGSIL UNIVERSITY RESEARCH CONSORTIUM TECHNO-PARK, Seoul (KR); KOREA ELECTROTECHNOLOGY RESEARCH INSTITUTE, Changwon-si, Gyeongsangnam-do (KR)

(*) Notice: Subject to any disclaimer, the term of this patent is extended or adjusted under 35 U.S.C. 154(b) by 1088 days.

(21) Appl. No.: 13/707,819

(22) Filed: Dec. 7, 2012

(65) Prior Publication Data
US 2013/0241774 A1   Sep. 19, 2013

(30) Foreign Application Priority Data

Mar. 15, 2012 (KR) .................. 10-2012-0026736
Sep. 4, 2012 (KR) .................. 10-2012-0097604

(51) Int. Cl.
G01S 5/02 (2010.01)
G01S 5/06 (2006.01)

(52) U.S. Cl.
CPC . *G01S 5/021* (2013.01); *G01S 5/06* (2013.01)

(58) Field of Classification Search
CPC .................. G01S 5/021; G01S 5/06
See application file for complete search history.

(56) References Cited

U.S. PATENT DOCUMENTS 8,489,098 B2* 7/2013 Wigren ................ G01S 5/10
455/436
2009/0243934 A1* 10/2009 Ameti ................. G01S 5/0009
342/465

FOREIGN PATENT DOCUMENTS

KR   10-2011-0051319 A   5/2011

OTHER PUBLICATIONS

M. Birchler, E911 Phase 2 Location Solution Landscape. FCC Location Round Table, Wireless Access Technology Research, Motorola Labs, Jun. 28, 1999.*
Beacon. (2011). The American Heritage Dictionary of the English Language. Boston, MA: Houghton Mifflin. Retrieved from http://search.credoreference.com/content/entry/hmdictenglang/beacon/0.*

* cited by examiner

*Primary Examiner* — Bernarr Gregory
*Assistant Examiner* — Fred H Mull
(74) *Attorney, Agent, or Firm* — Paratus Law Group, PLLC

(57) ABSTRACT

A wireless positioning server using clock offset compensation and a wireless positioning method using the same. The wireless positioning server using clock offset compensation estimates a precise position of a tag requiring position information by effectively predicting information regarding a distance between a beacon for performing positioning and the tag requiring position information. An error in the positioning estimation result due to a clock offset is minimized by measuring a relative clock frequency ratio between beacons and by compensating for clock frequencies of the beacons when a distance between a beacon and a tag is estimated.

12 Claims, 14 Drawing Sheets

FIG. 9
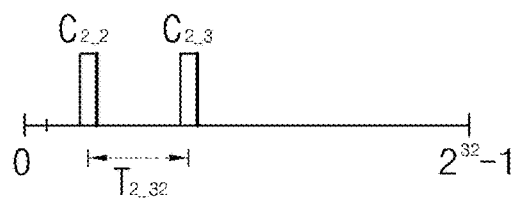
(a)
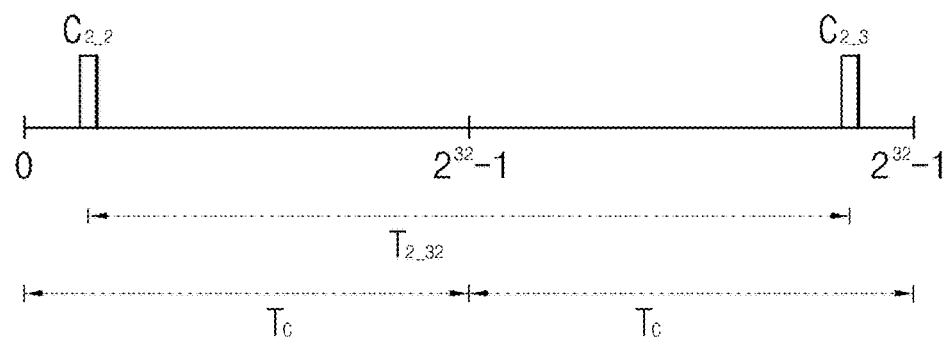
(b)
FIG. 10
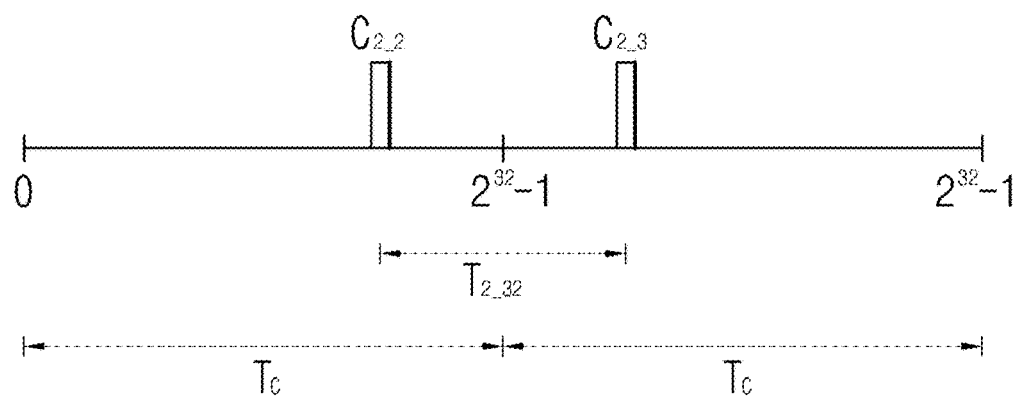

WIRELESS POSITIONING SERVER USING CLOCK OFFSET CALIBRATION POSITIONING METHOD USING THE SAME

CROSS-REFERENCE TO RELATED PATENT APPLICATION

This application claims the benefit of Korean Patent Application No. 10-2012-0026736, filed on Mar. 15, 2012, and Korean Patent Application No. 10-2012-0097604, filed on Sep. 4, 2012, in the Korean Intellectual Property Office, the disclosure of which is incorporated herein in its entirety by reference.

BACKGROUND OF THE INVENTION

1. Field of the Invention

The present invention relates to a wireless positioning server using clock offset compensation and a wireless positioning method using the same, and more particularly, to a wireless positioning server using clock offset compensation that may estimate a precise position of a tag requiring position information by effectively predicting information regarding a distance between a beacon for performing positioning and the tag requiring position information, and a wireless positioning method using the wireless positioning server.

2. Description of the Related Art

An indoor/outdoor wireless positioning technique is essential to implementation of a location based service (LBS) technique that has recently emerged. Since signals can be received from a global positioning system (GPS) that are clock-synchronized between satellites outdoors, positioning can be performed using a GPS technique. However, indoors where signals cannot be received from the GPS, a wireless positioning system that is suitable for an indoor environment, is required. Thus, research into a wireless positioning technique that is suitable for indoor wireless positioning, has proceeded briskly.

In general, information regarding a distance between a beacon of a positioning system and a tag that requires position information is required to perform wireless positioning. A wireless positioning technique that is based on time information, such as time of arrival (ToA) or time difference of arrival (TDoA), is mainly used to estimate the information regarding the distance between two devices, i.e., between the beacon and the tag.

Time information between the beacon and the tag for wireless positioning is estimated based on clock information between beacons. However, since an independent clock offset exists in clocks of the beacons, an error occurs in the estimated time information. Due to the effect of the clock offset, an error occurs in the result of estimating the distance between the beacon and the tag.

Although a relative clock offset in the beacons is a minor difference in units of part per million (ppm), the error in the clock information causes an error in the time information. Thus, the wireless positioning system that is based on time information, is very sensitive to the clock offset. Thus, clock offset compensation between the beacons is essential to a low error in position information that requires indoor wireless positioning.

In order to solve these problems, in the related art, Korean Patent Application Publication No. 2011-0051319 discloses a method of reducing a position estimating/updating period of a movement node and improving precision of positioning through line compensation of an error element in a wireless positioning network. However, in the related art, a two way ranging (TWR) method is used to estimate a position of a tag. Thus, the tag should transmit pulse twice, power consumption of the tag is large. In addition, since the ToA technique is used, a process in which the tag participates in time synchronization, is additionally required.

SUMMARY OF THE INVENTION

The present invention provides a wireless positioning server using clock offset compensation that may minimize an error in the positioning estimation result due to a clock offset by measuring a relative clock frequency ratio between beacons and by compensating for clock frequencies of the beacons when a distance between a beacon and a tag is estimated, and a wireless positioning method using the wireless positioning server.

According to an aspect of the present invention, there is provided a wireless positioning server including: a calibration pulse information receiving unit receiving calibration pulse information including clock count numbers of a first calibration pulse and a second calibration pulse from a plurality of beacons that receive the first calibration pulse and the second calibration pulse at a predetermined time interval from a calibration node; a clock offset compensation unit calculating a relative clock frequency ratio for clock offset compensation between the plurality of beacons by using the calibration pulse information; a position pulse information receiving unit receiving position pulse information including a clock count number of the position pulse from the plurality of beacons that receive a position pulse from a tag to be positioned; a receiving time synchronization unit synchronizing time when the second calibration pulse received by the plurality of beacons is received, as the same time; and a clock count calibration unit calculating calibrated clock count information between the beacon and the tag according to the beacons by using a difference between the clock count number of the position pulse and a clock count number corresponding to the synchronized time and the relative clock frequency ratio.

The wireless positioning server may further include a positioning estimation unit estimating a position of the tag by obtaining time information between each beacon and the tag by multiplying the calibrated clock count information by velocity of light according to the beacons and then by measuring time difference of arrival (TDoA) from the obtained time information.

The relative clock frequency ratio may be calculated using the following Equation:

$$f_i = \frac{C_{i\_2} - C_{i\_1}}{C_{0\_2} - C_{0\_1}} \text{ for } i = 0, 1, 2,$$

where $f_i$ is a relative clock frequency ratio of an i-th beacon, $C_{0\_1}$ and $C_{0\_2}$ are clock count numbers of the first and second calibration pulses that are received by a beacon (i=0), and $C_{i\_1}$ and $C_{i\_2}$ are clock count numbers of the first and second calibration pulses that are received by the i-th beacon.

If a clock count number $C_{i\_2}$ of the second calibration pulse that is received by the i-th beacon, is less than a clock count number $C_{i\_3}$ of the position pulse, the calibrated clock count information $C_i$ may be calculated using the following Equation:

$$C_i = \frac{C_{i\_3} - (C_{i\_2} - C_{cbi}) + \left\lfloor \frac{T_{i\_32}}{T_c} \right\rfloor \times C_{max}}{f_i},$$

where $C_i$ is calibrated clock count information of the i-th beacon, $C_{cbi}$ is clock count number information corresponding to a time interval between time when the second calibration pulse is received by the i-th beacon and the synchronized time, $T_{i\_32}$ is a difference between times when the second calibration pulse and the position pulse are received by the i-th beacon, $T_c$ is a clock one period, and $C_{max}$ is a maximum number of clock count during the clock one period.

If a clock count number $C_{i\_2}$ of the second calibration pulse that is received by the i-th beacon, is equal to or greater than a clock count number $C_{i\_3}$ of the position pulse, the calibrated clock count information $C_i$ may be calculated using the following Equation.

$$C_i = \frac{(C_{i\_3} + C_{max} + 1) - (C_{i\_2} - c_{cbi}) + \left\lfloor \frac{T_{i\_32}}{T_c} \right\rfloor \times C_{max}}{f_i}$$

If a difference $T_{i\_32}$ between time when the second calibration pulse is received by the i-th beacon and time when the position pulse is received is less than a clock one period $T_c$, the calibrated clock count information $C_i$ may be calculated using the following Equation:

$$C_i = \frac{C_{i\_3} - (C_{i\_2} - C_{cbi})}{f_i},$$

where $C_i$ is calibrated clock count information of the i-th beacon, and $C_{cbi}$ is clock count number information corresponding to a time interval between time when the second calibration pulse is received by the i-th beacon and the synchronized time.

If a difference $T_{i\_32}$ between time when the second calibration pulse is received by the i-th beacon and time when the position pulse is received is equal to or greater than a clock one period $T_c$, the calibrated clock count information $C_i$ may be calculated using the following Equation:

$$C_i = \frac{C_{i\_3} - (C_{i\_2} - C_{cbi}) + \left\lfloor \frac{T_{i\_32}}{T_c} \right\rfloor \times C_{max}}{f_i},$$

where $C_i$ is calibrated clock count information of the i-th beacon, $C_{cbi}$ is clock count number information corresponding to a time interval between time when the second calibration pulse is received by the i-th beacon and the synchronized time, and $C_{max}$ is a maximum number of clock count during the clock one period.

According to another aspect of the present invention, there is provided a wireless positioning method using clock offset compensation at a wireless positioning server, the wireless positioning method including: receiving calibration pulse information including clock count numbers of a first calibration pulse and a second calibration pulse from a plurality of beacons that receive the first calibration pulse and the second calibration pulse at a predetermined time interval from a calibration node; calculating a relative clock frequency ratio for clock offset compensation between the plurality of beacons by using the calibration pulse information; receiving position pulse information including a clock count number of the position pulse from the plurality of beacons that receive a position pulse from a tag to be positioned; synchronizing time when the second calibration pulse received by the plurality of beacons is received, as the same time; and calculating calibrated clock count information between the beacon and the tag according to the beacons by using a difference between the clock count number of the position pulse and a clock count number corresponding to the synchronized time and the relative clock frequency ratio.

The wireless positioning method may further include: obtaining time information between each beacon and the tag by multiplying the calibrated clock count information by velocity of light according to the beacons; and measuring time difference of arrival (TDoA) from the obtained time information so as to estimate a position of the tag.

According to another aspect of the present invention, there is provided a master beacon for wireless positioning, including: a calibration pulse information transmitting unit transmitting a first calibration pulse and a second calibration pulse to a plurality of slave beacons at a first time interval; a calibration pulse information receiving unit receiving calibration pulse information including clock count numbers of the first calibration pulse and the second calibration pulse from the plurality of slave beacons; a reflection pulse information obtaining unit receiving a first reflection pulse and a second reflection pulse from one selected from the plurality of slave beacons at the first time interval and obtaining reflection pulse information including clock count numbers of the first reflection pulse and the second reflection pulse; a clock offset compensation unit calculating a relative clock frequency ratio for clock offset compensation between a plurality of beacons including the master beacon and the plurality of slave beacons by using the calibration pulse information and the reflection pulse information; a position pulse information receiving unit receiving a position pulse from a tag to be positioned so as to obtain a clock count number of the received position pulse and receiving position pulse information including a clock count number of the position pulse from the plurality of slave beacons that receive the position pulse from the tag; a receiving time synchronization unit synchronizing time when the second calibration pulse is received by the plurality of slave beacons and time when the second reflection pulse is received by the master beacon, as the same time; and a clock count calibration unit calculating calibrated clock count information between each beacon and the tag according to the beacons by using a difference between a clock count number of the position pulse that are received by the plurality of slave beacons and the master beacon and a clock count number corresponding to the synchronized time and the relative clock frequency ratio.

The master beacon may further include a positioning estimation unit estimating a position of the tag by obtaining time information between each beacon and the tag by multiplying the calibrated clock count information by velocity of light according to the beacons and then by measuring time difference of arrival (TDoA) from the obtained time information.

The relative clock frequency ratio may be calculated using the following Equation:

$$f_i = \frac{C_{i\_2} - C_{i\_1}}{C_{0\_2} - C_{0\_1}} \text{ for } i = 0, 1, 2,$$

where $f_i$ is a relative clock frequency ratio of an i-th beacon, $C_{0\_1}$ and $C_{0\_2}$ are clock count numbers of the first and second calibration pulses that are received by a beacon (i=0), and $C_{i\_1}$ and $C_{i\_2}$ are clock count numbers of the first and second calibration pulses that are received by the plurality of slave beacons (i=1, 2).

If a clock count number $C_{i\_2}$ of the second calibration pulse or the second reflection pulse that is received by the i-th beacon, is less than a clock count number $C_{i\_3}$ of the position pulse, the calibrated clock count number $C_i$ (i=0) for the master beacon and the calibrated clock count number $C_i$ (i=1, 2) for the plurality of slave beacons may be calculated using the following Equation:

$$\text{if } i = 0, C_i = \frac{C_{i\_3} - (C_{i\_2} - 2(T_r + t_{msi}) \times f_i) + \left\lfloor \frac{T_{i\_32}}{T_c} \right\rfloor \times C_{max}}{f_i}$$

$$\text{otherwise, } C_i = \frac{C_{i\_3} - (C_{i\_2} - t_{msi} \times f_i) + \left\lfloor \frac{T_{i\_32}}{T_c} \right\rfloor \times C_{max}}{f_i},$$

where $C_i$ is calibrated clock count information of the i-th beacon, $T_r$ is the first time interval, $t_{ms1}$, when i=0, 1, is a time interval between time when the second calibration pulse is received by a slave beacon (i=1) and the synchronized time, and $t_{ms1}$, when i=2, is a time interval between time when the second calibration pulse is received by a slave beacon (i=2) and the synchronized time, $T_{i\_32}$ is a difference between time when the second calibration pulse is received by the i-th beacon and time when the position pulse is received by the i-th beacon, $T_c$ is a clock one period, and $C_{max}$ is a maximum number of clock count during the clock one period.

If a clock count number $C_{i\_2}$ of the second calibration pulse or the second reflection pulse that is received by the i-th beacon, is equal to or greater than a clock count number $C_{i\_3}$ of the position pulse, the calibrated clock count number $C_i$ (i=0) for the master beacon and the calibrated clock count number $C_i$ (i=1, 2) for the plurality of slave beacons may be calculated using the following Equation.

$$\text{if } i = 0,$$
$$C_i = \frac{(C_{i\_3} + C_{max} + 1) - (C_{i\_2} - 2(T_r + T_{msi}) \times f_i) + \left\lfloor \frac{T_{i\_32}}{T_c} \right\rfloor \times C_{max}}{f_i}$$

$$\text{otherwise, } C_i = \frac{(C_{i\_3} + C_{max} + 1) - (C_{i\_2} - t_{msi} \times f_i) + \left\lfloor \frac{T_{i\_32}}{T_c} \right\rfloor \times C_{max}}{f_i}$$

BRIEF DESCRIPTION OF THE DRAWINGS

The above and other features and advantages of the present invention will become more apparent by describing in detail exemplary embodiments thereof with reference to the attached drawings in which:

FIG. 9 and FIG. 10 illustrate examples of first and second cases of operation S550 of FIG. 5;

DETAILED DESCRIPTION OF THE INVENTION

The present invention will now be described more fully with reference to the accompanying drawings, in which exemplary embodiments of the invention are shown, in order for one of ordinary skill in the art to easily implement the invention.

Figure 1:
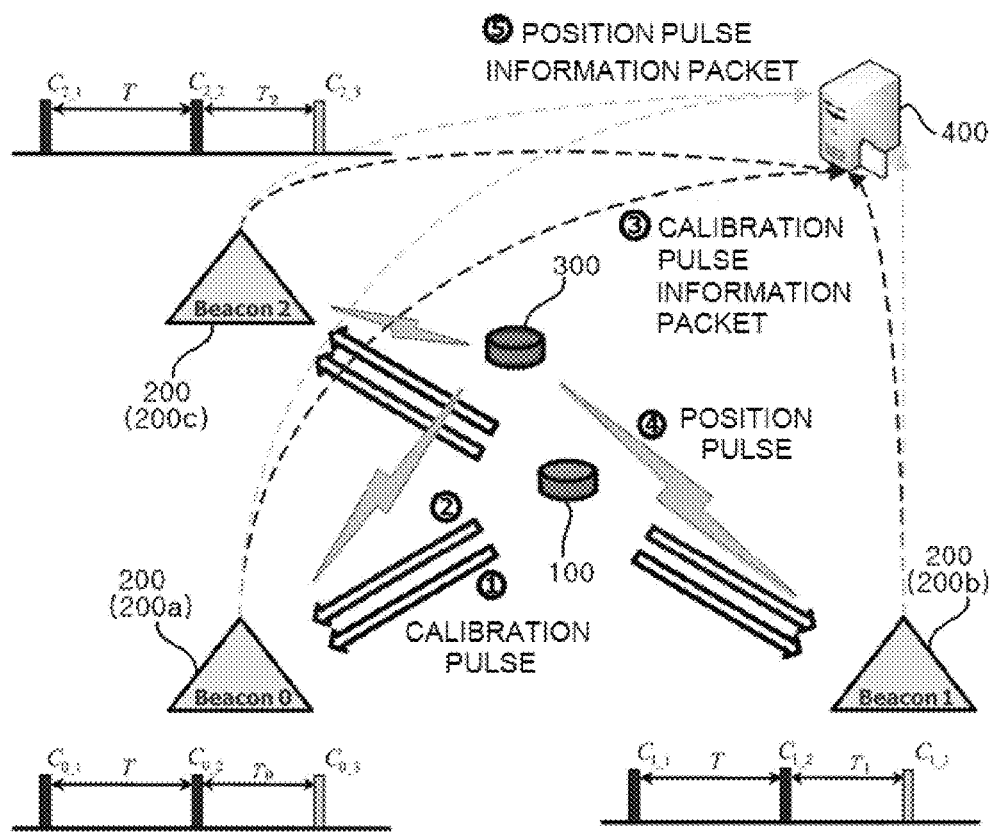
FIG. 1 illustrates a structure of a wireless positioning system according to an embodiment of the present invention.

FIG. 1 illustrates a structure of a wireless positioning system according to an embodiment of the present invention. Referring to FIG. 1, the wireless positioning system according to the current embodiment of the present invention includes a calibration node 100, a plurality of beacons 200a, 200b, and 200c, a tag 300, and a wireless positioning server 400 (hereinafter, a server).

The calibration node 100 transmits a first calibration pulse and a second calibration pulse to all beacons 200 at a predetermined time interval T (see ① and ② of FIG. 1).

Each of the beacons 200 receives the first calibration pulse and the second calibration pulse from the calibration node 100 and transmits calibration pulse information including clock count numbers of the first calibration pulse and the second calibration pulse (see ③ of FIG. 1).

After the second calibration pulse is transmitted, the tag 300 to be positioned transmits a position pulse to each beacon 200 (see ④ of FIG. 1).

Then, each beacon 200 receives the position pulse from the tag 300 and transmits position pulse information including a clock count number of the position pulse to the server 400 (see ⑤ of FIG. 1).

Figure 2:
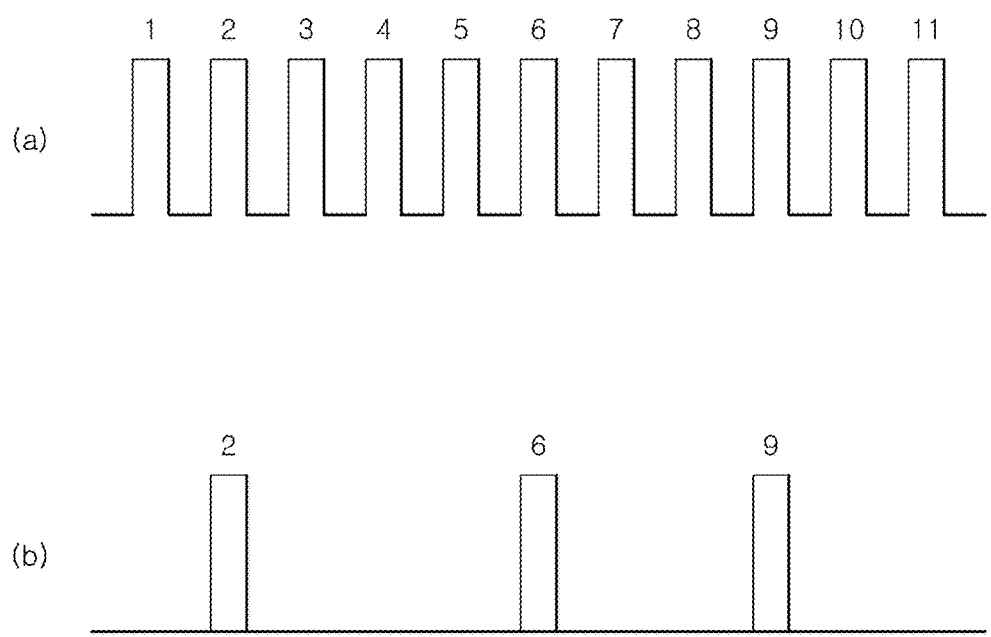
FIG. 2 illustrates clock count numbers according to an embodiment of the present invention.

Here, clock count numbers will be described with reference to FIG. 2. FIG. 2 illustrates clock count numbers according to an embodiment of the present invention.

(a) of FIG. 2 corresponds to an actual clock frequency pulse of a beacon 0, and each pulse has a count number. (b) of FIG. 2 indicates a first calibration pulse, a second calibration pulse, and a position pulse, which are received by the beacon 0, sequentially, and clock count numbers of the first calibration pulse, the second calibration pulse, and the position pulse are 2, 6, and 9, respectively. Obviously, this is just an example, and aspects of the present invention are not limited to FIG. 2.

Figure 3:
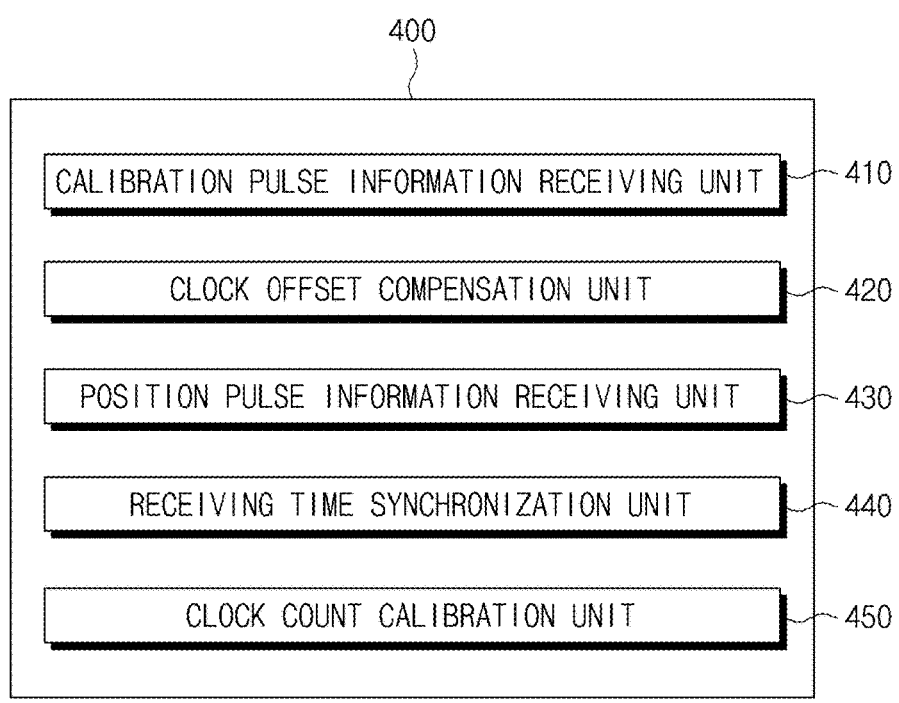
FIG. 3 illustrates a structure of a wireless positioning server illustrated in FIG. 1.

The server 400 calculates calibrated clock count information for wireless 30 positioning by using calibration pulse information and position pulse information. FIG. 3 illustrates a structure of the server 400 illustrated in FIG. 1. The server 400 includes a calibration pulse information receiving unit 410, a clock offset compensation unit 420, a position pulse information receiving unit 430, a receiving time synchronization unit 440, and a clock count calibration unit 450.

The calibration pulse information receiving unit 410 receives calibration pulse information including clock count numbers of the first calibration pulse and the second calibration pulse from the plurality of beacons 200 that receive the first calibration pulse and the second calibration pulse from the calibration node 100.

The clock offset compensation unit 420 calculates a relative clock frequency ratio for clock offset compensation between the beacons 200 according to the beacons 200 by using the received calibration pulse information.

The position pulse information receiving unit 430 receives position pulse information including a clock count number of the position pulse from the plurality of beacons 200 that receive the position pulse from the tag 300.

The receiving time synchronization unit 440 synchronizes all receiving times of the second calibration pulse that are received by the plurality of beacons 200, as the same time. The synchronization operation is conducive to reduction of a positioning error of the tag 300.

The clock count calibration unit 450 calculates calibrated clock count information between each beacon 200 and the tag 300 according to the beacons 200 by using a difference between the clock count number of the position pulse and a clock count number corresponding to the synchronization time and the relative clock frequency ration.

The server 400 further includes a positioning estimation unit (not shown). The positioning estimation unit (not shown) may estimate a position of the tag 300 by obtaining time information between each beacon 200 and the tag 300 by multiplying the calibrated clock count information by velocity of light and then by measuring TDoA from the time information. Here, a time difference of arrival (TDoA) technique is obvious in the art and thus detailed description thereof will be omitted.

Figure 4:
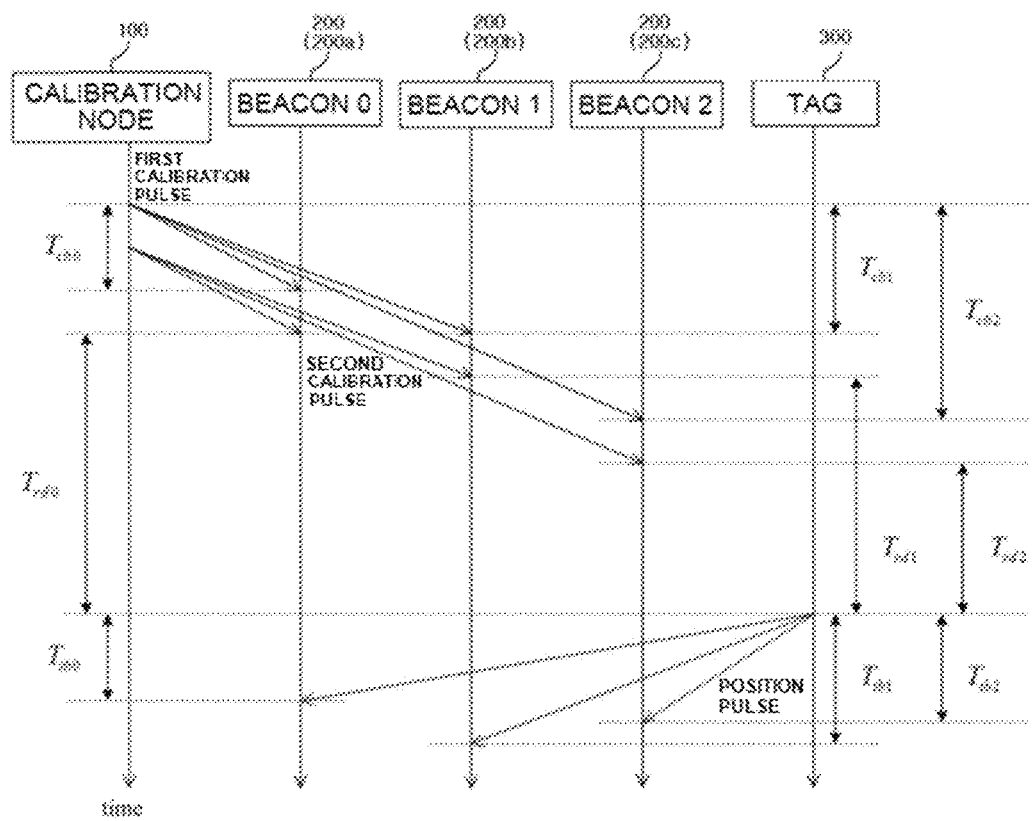
FIG. 4 illustrates transmitting/receiving times of pulses in FIG. 1.

FIG. 4 illustrates transmitting/receiving times of pulses in FIG. 1. In FIG. 4, a lengthwise direction is a flow of time (vertical direction).

If the calibration node 100 transmits a first calibration pulse, a first calibration pulse is received by each of the beacons 200a, 200b, and 200c. Times when the calibration node 100 transmits the first calibration pulse, are the same at all of the beacons 200. However, when distances between the calibration node 100 and each of the beacons 200 are different from each other, Times when the first calibration pulse is received by each beacon 200, are different from each other, as illustrated in FIG. 4. $T_{cb\_i}$ is time when the first calibration pulse transmitted by the calibration node 100 is received by an i-th beacon. FIG. 4 illustrates an example in which receiving times of the first calibration pulse become slower as it gets closer to a beacon 2 from a beacon 0.

The calibration node 100 transmits a second calibration pulse after a predetermined time T has elapsed from a first calibration pulse transmitting time, and the second calibration pulse is received by each of the beacons 200a, 200b, and 200c at different times.

Next, the tag 300 transmits the position pulse to each of the beacons 200a, 200b, and 200c at the same transmission time.

In FIG. 4, $T_{rd\_i}$ is time between time when the second calibration pulse is received by the i-th beacon 200 and time when the position pulse is transmitted from the tag 300. $T_{tb\_i}$ is time between time when the position pulse is transmitted from the tag 300 and time when the position pulse is received by the i-th beacon 200, which means time when the position pulse reaches the i-th beacon 200 from the tag 300.

In order to measure a distance between each beacon 200 and the tag 300, time information between the second calibration pulse of the calibration node 100 that is received by the beacon 200 and the position pulse of the tag 300, as illustrated in FIG. 4. In this case, since counters of the beacons 200 have independent clock offsets, an error is included in time information that is estimated from each beacon 200. By using time information including the error in a ToA technique or a TDoA technique, wireless positioning performance is deteriorated. The degree of an error of time information measured at each beacon 200 may be estimated using Equation 1:

$$t_{offset\_i} - t_{ideal\_i} = \frac{(T_{rd\_i} + T_{tb\_i})(f_{offset\_i} - f)}{f}, \quad \text{[Equation 1]}$$

where i is a number of the beacon 200, and i=0, 1, and 2. $f_{offset\_i}$ is a clock frequency offset of a beacon i, and f is an ideal clock frequency having no offset. $t_{offset\_i}$ is 'time information including an error' that is measured when a clock offset exists in the beacon i, and $t_{ideal\_i}$ is actual time information having no error that is measured when a clock offset does not exist in the beacon i.

Referring to FIG. 4 and Equation 1, an error of clock information caused by a clock offset is continuously increased due to cumulative clock offsets when the tag 300 transmits the positioning estimation pulse after a long time has elapsed after the calibration pulse of the calibration node 100 is received by the beacon i, i.e., as $T_{rd\_i}$ that is relatively larger than $T_{tb\_i}$ increases. The error of the cumulative clock information causes a serious error in the result of estimating a position of the tag 300.

According to an embodiment of the present invention, a clock offset in the clock count information having an offset is compensated for by using not the ideal frequency f but using the relative frequency offset ratio $f_i$ of $f_{offset\_i}$.

That is, according to an embodiment of the present invention, the wireless positioning system of FIG. 1 is used to estimate $f_i$ that is required for clock offset compensation. Here, the calibration node 100 transmits two calibration pulses to each beacon 200 at a predetermined time interval T. After the server 400 performs clock offset compensation and synchronization between the beacons 200 from clock count numbers of two calibration pulses obtained from each beacon 200, the tag 300 estimates position information of the tag 300 by using the position pulse to be transmitted to each beacon 200.

Figure 5:
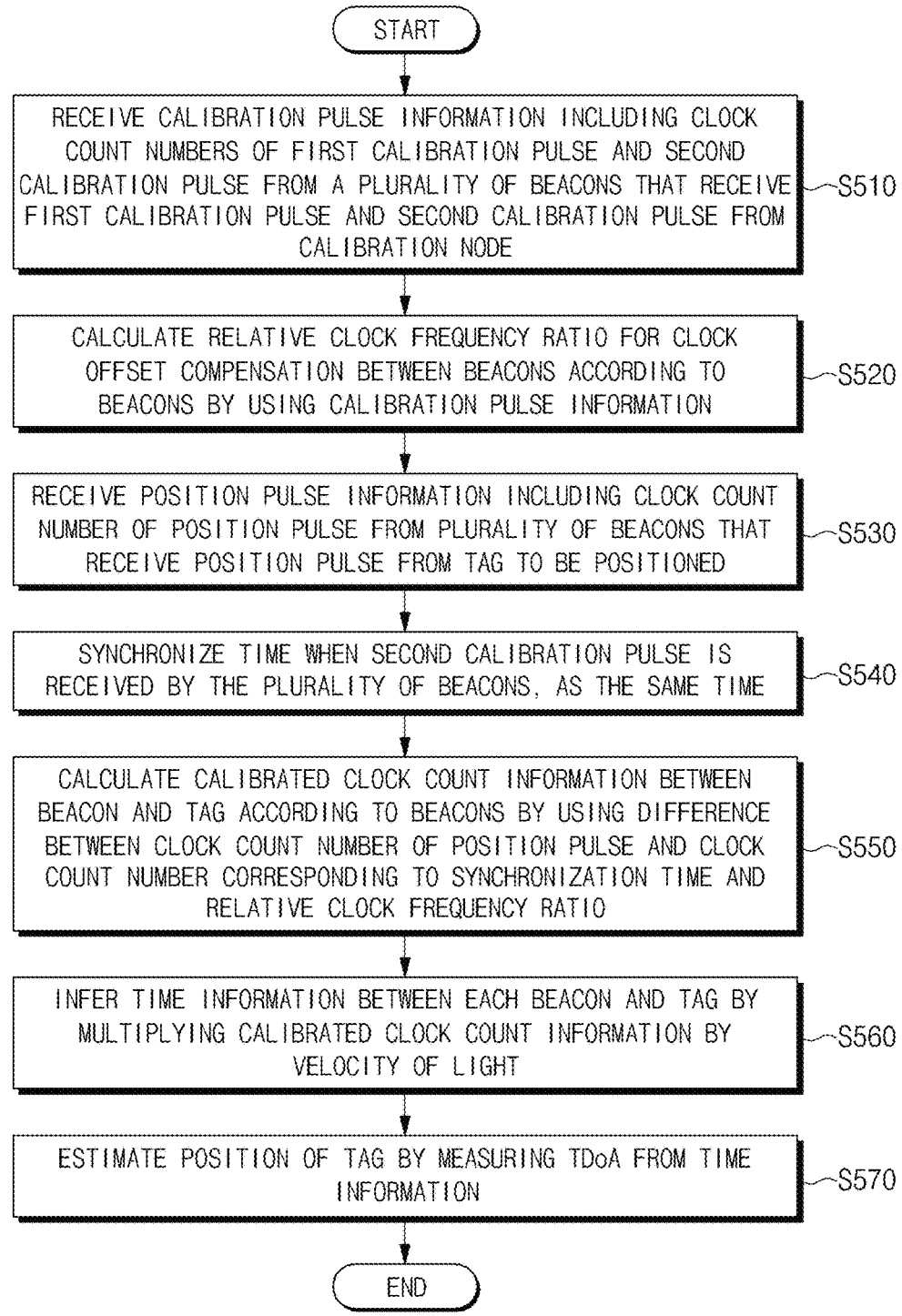
FIG. 5 is a flowchart illustrating a wireless positioning method using clock offset compensation at the wireless positioning server of FIG. 1.

Hereinafter, a wireless positioning method using clock offset compensation according to an embodiment of the present invention will be described in detail. FIG. 5 is a flowchart illustrating a wireless positioning method using clock offset compensation at the wireless positioning server of FIG. 1.

First, in operation S510, the calibration pulse information receiving unit 410 receives calibration pulse information including clock count numbers of the first calibration pulse and the second calibration pulse from the plurality of beacons 200 that receive the first calibration pulse and the second calibration pulse from the calibration node 100 at a predetermined time interval T.

In operation S520, the clock offset compensation unit 420 calculates a relative clock frequency ratio for clock offset compensation between the beacons according to the beacons by using the calibration pulse information.

In operation S520, the relative clock frequency ratio is calculated using Equation 2:

$$f_i = \frac{C_{i\_2} - C_{i\_1}}{C_{0\_2} - C_{0\_1}} \text{ for } i = 0, 1, 2, \qquad \text{[Equation 2]}$$

where $f_i$ is a relative clock frequency ratio of an i-th beacon (beacon i), $C_{0\_1}$ and $C_{0\_2}$ are clock count numbers of the first and second calibration pulses that are received by a beacon of i=0 (beacon 0), and $C_{i\_1}$ and $C_{i\_2}$ are clock count numbers of the first and second calibration pulses that are received by the i-th beacon. The clock count numbers may be obtained from the drawing in the vicinity of each beacon 200 of FIG. 1.

As shown in Equation 2, the relative clock frequency ratio is obtained based on beacon 0. However, aspects of the present invention are not limited to beacon 0; in case of beacon 0 that is a base, a numerator and a denominator have the same value in Equation 2 and thus $f_0=1$.

Figure 6:
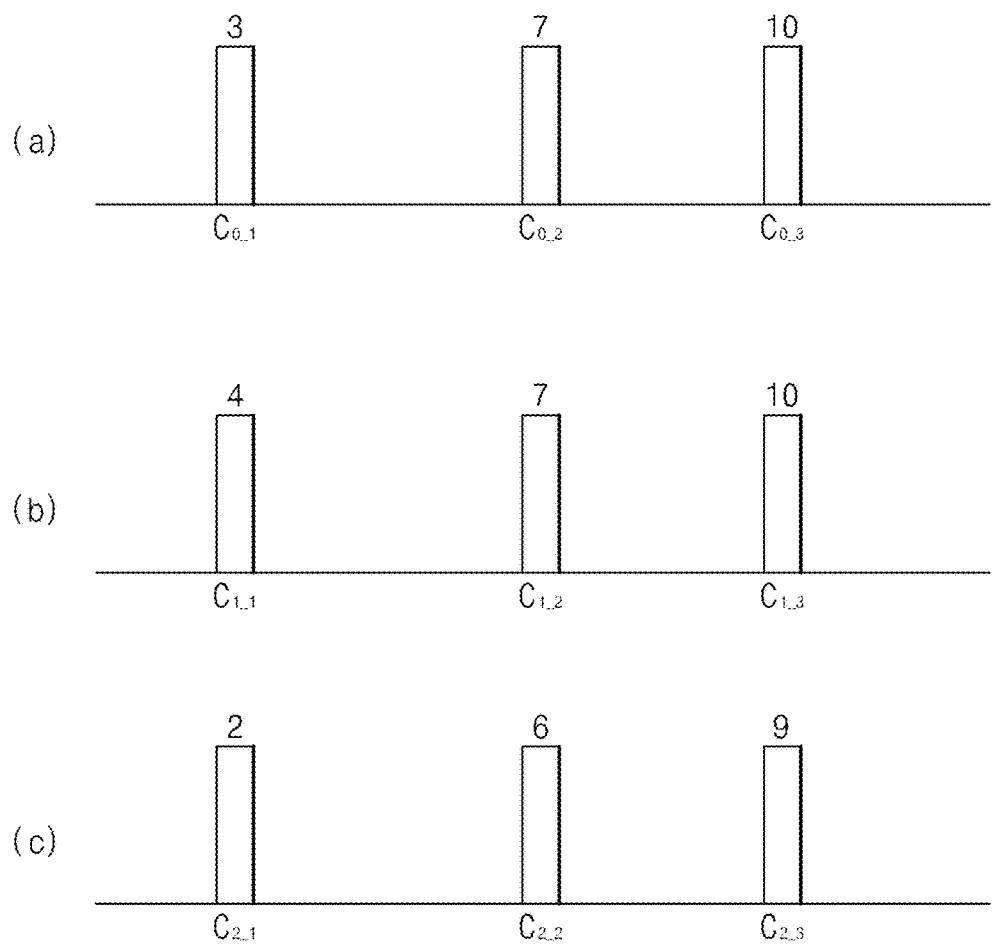
FIG. 6 illustrates examples of calculation of operation S520 of FIG. 5.

FIG. 6 illustrates examples of calculation of operation S520 of FIG. 5. When clock count numbers at beacon 0, beacon 1, and beacon 2 are the same as illustrated in FIG. 6, $f_0=(7-3)/(7-3)=1$, $f_1=(7-4)/(7-3)=0.75$, $f_2=(6-2)/(7-3)=1$.

Figure 7:
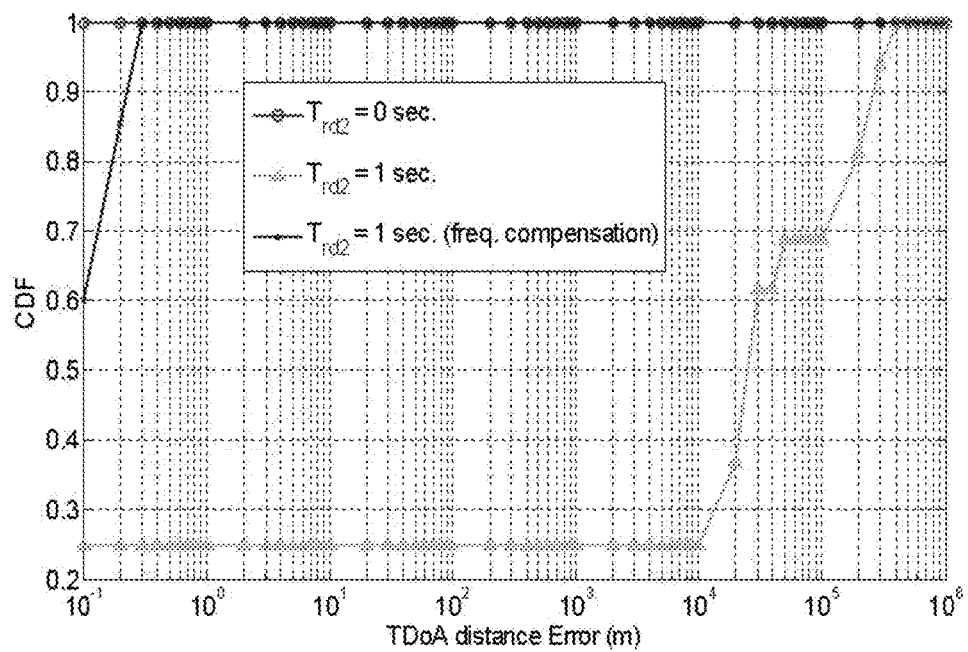
FIG. 7 is a graph showing the result of comparing a distance estimation error due to clock offset compensation according to an embodiment of the present invention with a distance estimation error according to the related art.

FIG. 7 is a graph showing the result of comparing a distance estimation error due to clock offset compensation according to an embodiment of the present invention with a distance estimation error in the existing case. Here, the existing case is the case that clock offset compensation is not used, unlike in the present invention.

In FIG. 7, a clock offset of beacon 2 is set to a value up to 1000 ppm, and the result of estimating a TDoA distance is illustrated according to a response time of the tag 300. A case where $T_{rd\_2}$ is 0 sec is the case that time when the second calibration pulse is received by beacon 2 (200b) and time when the position pulse is transmitted from the tag 300 are the same, and cumulative clock offsets do not occur, and thus there is no error in distance information.

Contrary to this, when $T_{rd\_2}$ is 1 sec, i.e., when clock offset compensation is not performed, like in the existing case, a clock offset of 1 sec is cumulative on the clock count information and affects the time information. An error of the result of estimating a distance including calculated time information is up to about $10^6$ m. However, an error of the result of estimating a distance when a clock offset compensation technique, like in FIG. 1, is within about 30 cm.

After operation S520, in operation S530, the position pulse information receiving unit 430 receives position pulse information including a clock count number of the position pulse from the plurality of beacons 200 that receive the position pulse from the tag 300 to be positioned.

Next, in operation S540, the receiving time synchronization unit 440 synchronizes time when the second calibration pulse is received by the plurality of beacons 200, as the same time. Since times when the second calibration pulse is received by the beacons 200a, 200b, and 200c are different from each other (see FIG. 4), in the present embodiment, the receiving time synchronization unit 440 performs an operation of synchronizing the times as the same time.

Figure 8:
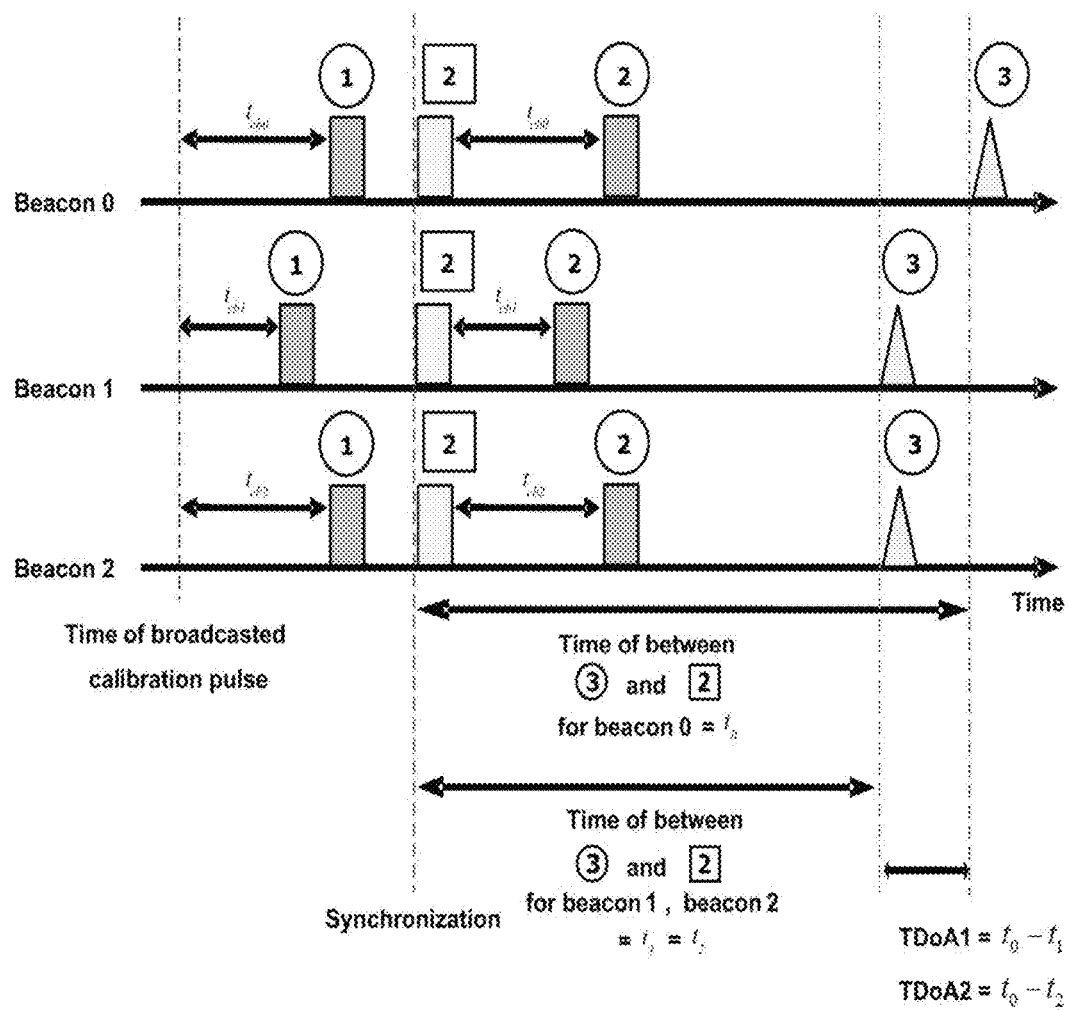
FIG. 8 is a conceptual view for explaining operations S540 and S550 of FIG. 5.

FIG. 8 is a conceptual view for explaining operations S540 and S550 of FIG. 5. In FIG. 8, ① indicates time when the first calibration pulse is received by each beacon, and ② indicates time when the second calibration pulse is received by each beacon, and ③ indicates time when the position pulse is received by each beacon. In operation S540, the receiving time synchronization unit 440 synchronizes the receiving time (time ② of FIG. 8) of the second calibration pulse as time ② for each beacon.

Thereafter, in operation S550, the clock count calibration unit 450 calculates calibrated clock count information between the beacon 200 and the tag 300 according to the beacons 200 by using a difference between a clock count number of the position pulse and a clock count number corresponding to the synchronization time and the relative clock frequency ratio $f_i$ that is calculated in Equation 2.

That is, in operation S550, clock count information including an offset between the tag 300 and the beacon 200 is calibrated by using $f_i$ calculated in Equation 2 and the clock count numbers of the pulses.

Calculation of the calibrated clock count information is classified into two cases, i.e., the case that a clock count number $C_{i\_2}$ of the second calibration pulse that is received by the i-th beacon (beacon i) is less than a clock count number $C_{i\_3}$ of the position pulse and the case that the clock count number $C_{i\_2}$ of the second calibration pulse that is received by the i-th beacon (beacon i) is equal to or greater than the clock count number $C_{i\_3}$ of the position pulse (second case).

FIG. 9 illustrates an example of the first case ($C_{i\_2}<C_{i\_3}$) of operation S550 of FIG. 5. In FIG. 9, for convenience of explanation, beacon 2 (i=2) is illustrated.

First, when $C_{i\_2}<C_{i\_3}$ (first case), calibrated clock count information $C_i$ of the i-th beacon (beacon i) 200 is calculated using Equation 3:

$$C_i = \frac{C_{i\_3} - (C_{i\_2} - C_{cbi}) + \left\lfloor \frac{T_{i\_32}}{T_c} \right\rfloor \times C_{max}}{f_i}, \qquad \text{[Equation 3]}$$

where $C_i$ is calibrated clock count information of the i-th beacon, $T_{i\_32}$ is a difference between times when the second calibration pulse and the position pulse are received by the i-th beacon, $T_c$ is a clock one period, and $C_{max}$ is a maximum number of clock count during the clock one period and corresponds to a preset value. For example, $C_{max}$ may correspond to $2^{32}-1$, and in this case, clock count numbers are up to 0, 1, 2, . . . , and $2^{32}-1$.

$C_{cbi}$ is clock count number information corresponding a time interval ($t_{cbi}$ of FIG. 8) between time when the second calibration pulse is received by the i-th beacon (time ② of FIG. 8) and the synchronization time (time ② of FIG. 8). That is, $t_{cbi}$ is a value that is obtained by subtracting the synchronized time (time ② of FIG. 8) from the time when the second calibration pulse is received by the i-th beacon (time ② of FIG. 8), and $C_{cbi}$ is a clock count number corresponding to $t_{cbi}$.

$C_{cbi}$ is an ideal clock count number information that exists between the calibration node 100 and the i-th beacon (beacon i) 200 and corresponds to an actual distance between the calibration node 100 and the i-th beacon (beacon i) 200, which is a preset value.

That is, since, in the present invention, it is assumed that the position of the calibration node 100 and the position of each beacon 200 have been previously set, the actual clock count number information $C_{cbi}$ between the calibration node 100 and the i-th beacon 200 may be expressed as a value ($C_{cbi}=t_{cbi}\times f$) that is obtained by multiplying time information $t_{cbi}$ corresponding to the actual distance between the calibration node 100 and the i-th beacon 200 by the ideal clock frequency f. Obviously, although, in the present embodiment, the above-described ideal $C_{cbi}$ is used for an arithmetic operation of $C_i$, $C_{i\_1}$ instead of $C_{cbi}$ may be used.

Thus, ($C_{i\_2}-C_{cbi}$) of a numerator of Equation 3 corresponds to a clock count number corresponding to the synchronization time (time ② of FIG. 8) for the i-th beacon and is the same as a value that is obtained by subtracting a clock count number at an ideal receiving time (time ① of FIG. 8) of the first calibration pulse from a clock count number at the time (time ② of FIG. 8) when the second calibration pulse is received by the i-th beacon (beacon i).

$C_{i\_3}$ in Equation 3 is a clock count number corresponding to the receiving time (time ② of FIG. 8) of the position pulse and is different according to the beacons 200, as illustrated in FIG. 8. '$C_{i\_3}-(C_{i\_2}-C_{cbi})$' of a numerator of Equation 3 corresponds to a value that is obtained by subtracting the clock count number ($C_{i\_2}-C_{cbi}$) corresponding to the synchronization time (time ② of FIG. 8) from the count number $C_{i\_3}$ of the position pulse in FIG. 8.

As a result, $C_{i\_3}-(C_{i\_2}-C_{cbi})$ in Equation 3 corresponds to a clock count number corresponding to time $t_i$ between the receiving time (time ③ of FIG. 8) of the position pulse and the synchronized receiving time (time ② of FIG. 8) of the second calibration pulse.

$\lfloor \ \rfloor$ in Equation 3 is an arithmetic operation in which a decimal point is discarded, and if $T_{i\_32}$ is less than $T_c$, an $\lfloor \ \rfloor$ operational value is 0, and if $T_{i\_32}$ is greater than $T_c$, the $\lfloor \ \rfloor$ operational value is a natural number that is equal to or greater than 1.

The first case ($C_{i\_2}<C_{i\_3}$) may be divided into (a) and (b) of FIG. 9 according to a difference in the sizes of $T_{i\_32}$ and $T_c$ (a) of FIG. 9 is the case that the second calibration pulse and the position pulse are sequentially received within one period $T_c$ of a pulse and $C_{2\_2}<C_{2\_3}$ and $T_{i\_32}<T_c$, and (b) of FIG. 9 is the case that, after the second calibration pulse is received at the former part of a first period, the position pulse is received at the latter part of a second period and $C_{2\_2}<C_{2\_3}$ and $T_{i\_32}\geq T_c$.

If $C_{2\_2}<C_{2\_3}$ and $T_{i\_32}>T_c$, as illustrated in (a) of FIG. 9, $\lfloor \ \rfloor$ is 0, and if $C_{2\_2}<C_{2\_3}$ and $T_{i\_32}\geq T_c$, as illustrated in (b) of FIG. 9, $\lfloor \ \rfloor$ is 1.

In this way, in the first case ($C_{i\_2}<C_{i\_3}$), beacons are synchronized using ($C_{i\_2}-C_{cbi}$), and it is checked how many periods at which a count between a receiving time $T_{i\_2}$ of the second calibration pulse and a receiving time $T_{i\_3}$ of the position pulse is measured, thereby obtaining a value of $\lfloor \ \rfloor$ of Equation 3.

A time difference $T_{i\_32}$ between the time $T_{i\_3}$ when the position pulse is received by the i-th beacon and the time $T_{i\_2}$ when the second calibration pulse is received by the i-th beacon may be obtained using $T_{i\_3}-T_{i\_2}$. If $T_{i\_32}$ is equal to or greater than $T_c$ that is one period of a clock, it may be checked how many periods that have passed between $C_{i\_2}$ and $C_{i\_3}$ by using an $\lfloor \ \rfloor$ arithmetic operation. Thus, the clock count calibration unit 450 may measure clock count information between the tag 300 and each beacon 20 by adding a value that is obtained by multiplying the $\lfloor \ \rfloor$ arithmetic operation value by the maximum count value $C_{max}$, to ($C_{i\_3}-(C_{i\_2}-C_{cbi})$), and the clock count information is divided by $f_i$ so as to compensate for a clock offset of the beacons. That is, count information including an offset is calibrated by performing the above-described operation.

In operation S560, time information may be inferred by multiplying the calibrated clock count information by velocity of light, and in operation S570, by measuring TDoA from the time information, the positioning estimation result in which the effect of a clock offset is minimized, may be obtained.

Next, when $C_{i\_2}\geq C_{i\_3}$ (second case), the calibrated clock count information $C_i$ may be calculated using Equation 4:

$$C_i = \frac{(C_{i\_3} + C_{max} + 1) - (C_{i\_2} - c_{cbi}) + \left\lfloor \frac{T_{i\_32}}{T_c} \right\rfloor \times C_{max}}{f_i} \quad \text{[Equation 4]}$$

All factors in Equation 4 are defined in Equation 3, as described above.

FIG. 10 illustrates an example of the second case ($C_{i\_2}\geq C_{i\_3}$) of operation S550 of FIG. 5. In FIG. 10, after the second calibration pulse is received at the latter part of the first period of a pulse, the position pulse is received at the former part of the second period, and $C_{2\_2}\geq C_{2\_3}$ and $T_{i\_32}<T_c$.

A clock counter performs an operation of counting from 0 to $C_{max}$ repeatedly. In this case, $C_{i\_2}$ may be measured at the beacon before $C_{max}$, and $C_{i\_3}$ may be measured immediately after $C_{max}$, as illustrated in FIG. 10. Thus, in case of $C_{2\_2}\geq C_{2\_3}$, as illustrated in FIG. 10, the clock count calibration unit 450 performs an arithmetic operation in the same manner as Equation 3 after adding $C_{max}+1$ (that is, $2^{32}$) to $C_{i\_3}$, as shown in Equation 4.

After a value $C_i$ is calculated according to the beacons to be suitable for the first case ($C_{i\_2}<C_{i\_3}$) and the second case ($C_{i\_2}\geq C_{i\_3}$), as described above, in operation S360, a positioning estimation unit (not shown) obtains time information between each beacon 200 and the tag 300 by multiplying the calibrated clock count information $C_i$ by velocity of light according to the beacons 200. In operation S370, the positioning estimation unit (not shown) estimates a position of the tag 300 by measuring TDoA from the obtained time information. Here, the positioning estimation operation by measuring TDoA in operation S370 is well known to one of ordinary skill in the art, and thus detailed description thereof will be omitted.

In addition, in an embodiment of the present invention, the calibrated clock count information $C_i$ may be calculated based on time.

That is, when a difference $T_{i\_32}$ between time when the second calibration pulse is received by the i-th beacon and time when the position pulse is received by the i-th beacon is less than a clock one period $T_c$, the calibrated clock count information $C_i$ is calculated using Equation 5:

$$C_i = \frac{C_{i\_3} - (C_{i\_2} - C_{cbi})}{f_i}, \quad \text{[Equation 5]}$$

where, obviously, $C_i$ is calibrated clock count information of the i-th beacon, and $C_{cbi}$ is clock count number information corresponding to a time interval between the time when the second calibration pulse is received by the i-th beacon and the synchronized time.

In addition, when the difference $T_{i\_32}$ between the time when the second calibration pulse is received by the i-th beacon and the time when the position pulse is received by the i-th beacon is equal to or greater than the clock one period $T_c$, the calibrated clock count information $C_i$ is calculated in the same manner as Equation 3, as described above.

According to the current embodiment of the present invention as described above with reference to FIG. 1, a clock frequency of beacons is calibrated by measuring a relative clock frequency ratio when an operation of estimating a distance between the beacon and the tag is performed so that an error in the positioning estimation result due to a clock offset may be minimized. The result of recognizing a distance between a tag to be positioned and a beacon of the wireless positioning system is significant for precise positioning estimation, and one of factors that affect the distance recognizing result, is a clock offset of the beacons, as described above. In the current embodiment, a technique for measuring time information by compensating clock count information of the beacons including a clock offset using the relative clock frequency ratio is used so as to minimize the effect of the clock offset when positioning estimation is performed, clock count information of the beacons having a clock offset is calibrated by using the relative clock frequency ratio. In FIG. 1, an effective wireless positioning method, whereby a positioning estimation error due to the clock offset may be reduced within 50 cm and the effect of the clock offset may be minimized, is provided.

In addition, in FIG. 1, a calibration node transmits two pulses for clock offset compensation and wireless synchronization between the beacons, and then, the two calibration pulses are received by all beacons so that the wireless positioning system may perform wireless positioning of the tag continuously. That is, in FIG. 1, a denominator of Equation 3 or 4 is calculated by performing a calibration pulse transmitting operation that is operations ① through ③, at an initial stage, and then by performing a position pulse transmitting operation that is operations ④ and ⑤, so that wireless positioning of the tag 300 may be continuously performed.

In FIG. 1, each of the beacons transmits a packet only to the server 400 that has no link between the beacons and is connected via a wired/wireless manner, and does not need to transmit a reflection pulse after the pulse of the calibration node 100 or the tag 300 is received. In addition, when it is assumed that a wired connection exists between the beacon and the server 400, pulse collision between the tag and the calibration node and between the tag and the beacon does not occur so that the reliability of wireless positioning of the tag may be guaranteed. Furthermore, wireless synchronization may be performed, unlike in existing wired synchronization between the beacons so that the wireless positioning system may be easily installed. As a result, in FIG. 1, high precision of several tens of cm may be obtained, and the tag is designed with a small low-power device so that the present invention may be applied to various industries including personal mobile communication, radio frequency identification (RFID), logistic management, and the like.

Hereinafter, another embodiment of the present invention will be described. In the present embodiment, a wireless positioning system having the effects according to the above-described embodiments and a master beacon for the wireless positioning system are provided. In the present embodiment, the master beacon estimates the position of a tag by using its own information and information regarding a plurality of slave beacons without using a calibration node, unlike in the above-described embodiment.

Figure 11:
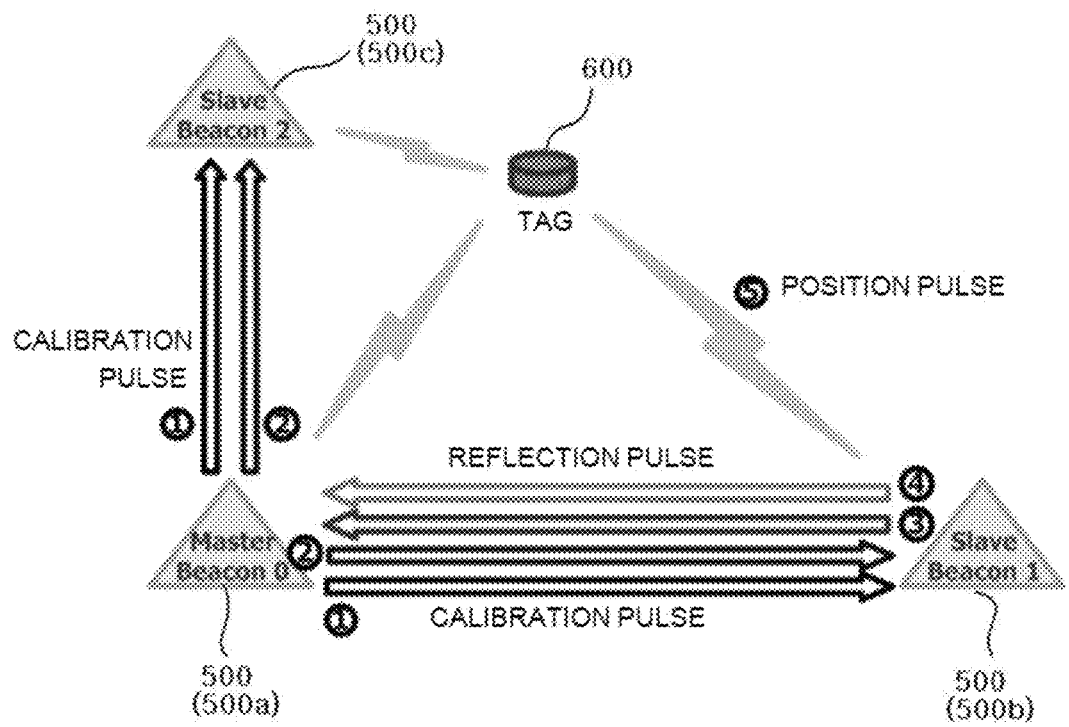
FIG. 11 illustrates a structure of a wireless positioning system according to another embodiment of the present invention.

FIG. 11 illustrates a structure of a wireless positioning system according to another embodiment of the present invention.

Referring to FIG. 11, the wireless positioning system according to the current embodiment of the present invention includes a plurality of beacons 500 including a master beacon 500a and a plurality of slave beacons 500b and 500c, and a tag 600.

The master beacon 500a transmits a first calibration pulse and a second calibration pulse to all of the slave beacons 500b and 500c at a first time interval (times ① and ② of FIG. 11). Then, each of the slave beacons 500b and 500c retransmits calibration pulse information including clock count numbers of the received first and second calibration pulses to the master beacon 500a.

Next, one selected from the slave beacons 500b and 500c (500b in the present embodiment) transmits a first reflection pulse and a second reflection pulse to the master beacon 500a at the first time interval (times ③ and ④ of FIG. 11). Thus, the master beacon 500a obtains reflection pulse information including the clock count numbers of the received first and second reflection pulses.

Next, the tag 600 to be positioned transmits a position pulse to all of the beacons 500a, 500b, and 500c simultaneously (time ⑤ of FIG. 11). Then, the master beacon 500a obtains the clock count number of the position pulse that is directly received from the tag 600.

In addition, the plurality of slave beacons 500b and 500c receives the position pulse from the tag 600 and transmits clock count information including a clock count number of the received position pulse to the master beacon 500a. Thus, the master beacon 500a obtains position pulse information that is received by the master beacon 500a and position pulse information that is received by the slave beacons 500b and 500c.

Figure 12:
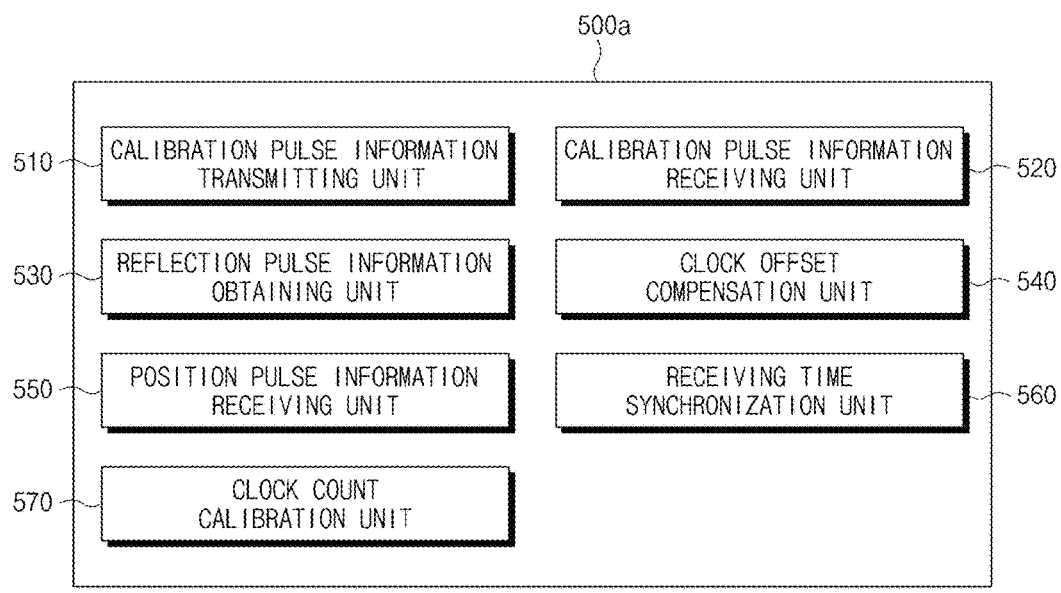
FIG. 12 illustrates a structure of a master beacon illustrated in FIG. 11.

The master beacon 500a calculates calibrated clock count information for wireless positioning by using the calibration pulse information, the reflection pulse information, and the position pulse information that are obtained by the above-described operations. FIG. 12 FIG. 12 illustrates a structure of the master beacon 500a illustrated in FIG. 11.

The master beacon 500a includes a calibration pulse information transmitting unit 510, a calibration pulse information receiving unit 520, a reflection pulse information obtaining unit 530, a clock offset compensation unit 540, a position pulse information receiving unit 550, a receiving time synchronization unit 560, and a clock count calibration unit 570.

The calibration pulse information transmitting unit 510 transmits a first calibration pulse and a second calibration pulse to the plurality of slave beacons 500b and 500c at a first time interval. The calibration pulse information receiving unit 520 receives calibration pulse information including clock count numbers of the first calibration pulse and the second calibration pulse from the plurality of slave beacons 500b and 500c. The definition of the clock count numbers is described in FIG. 2, as described above, and thus will be omitted.

The reflection pulse information obtaining unit 530 receives a first reflection pulse and a second reflection pulse from one slave beacon, for example, 500b selected from the plurality of slave beacons 500b and 500c at the first time interval and then, obtains reflection pulse information including clock count numbers of the first reflection pulse and the second reflection pulse.

The clock offset compensation unit 540 calculates a relative clock frequency ratio for clock offset compensation between the plurality of beacons 500a, 500b, and 500c including the master beacon 500a and the plurality of slave beacons 500b and 500c according to the beacons 500a, 500b, and 500c by using the calibration pulse information and the reflection pulse information.

The position pulse information receiving unit 550 receives a position pulse from the tag 600, obtain a clock count number of the received position pulse, and receives position pulse information including the clock count number of the position pulse from the plurality of slave beacons 500b and 500c each receiving the position pulse from the tag 600.

The receiving time synchronization unit 560 synchronizes a receiving time of the second calibration pulse that are received by the plurality of slave beacons 500b and 500c and a receiving time of the second reflection pulse that is received by the master beacon 500a, as the same time.

The clock count calibration unit 570 calculates calibrated clock count information between each beacon 500 and the tag 600 by using a difference between the clock count number of the position pulse that are received by the plurality of slave beacons 500b and 500c and the master beacon 500 and a clock count number corresponding to the synchronized time, and the relative clock frequency ratio.

As described above with reference to FIG. 1, by multiplying the calibrated clock count information by velocity of light, time information between each beacon 500 and the tag 600 may be checked, and by measuring TDoA from the time information, the position of the tag 600 may be estimated.

Hereinafter, a wireless positioning method using clock offset compensation according to another embodiment of the present invention will be described with reference to FIGS. 13 and 14 in detail.

Figure 13:
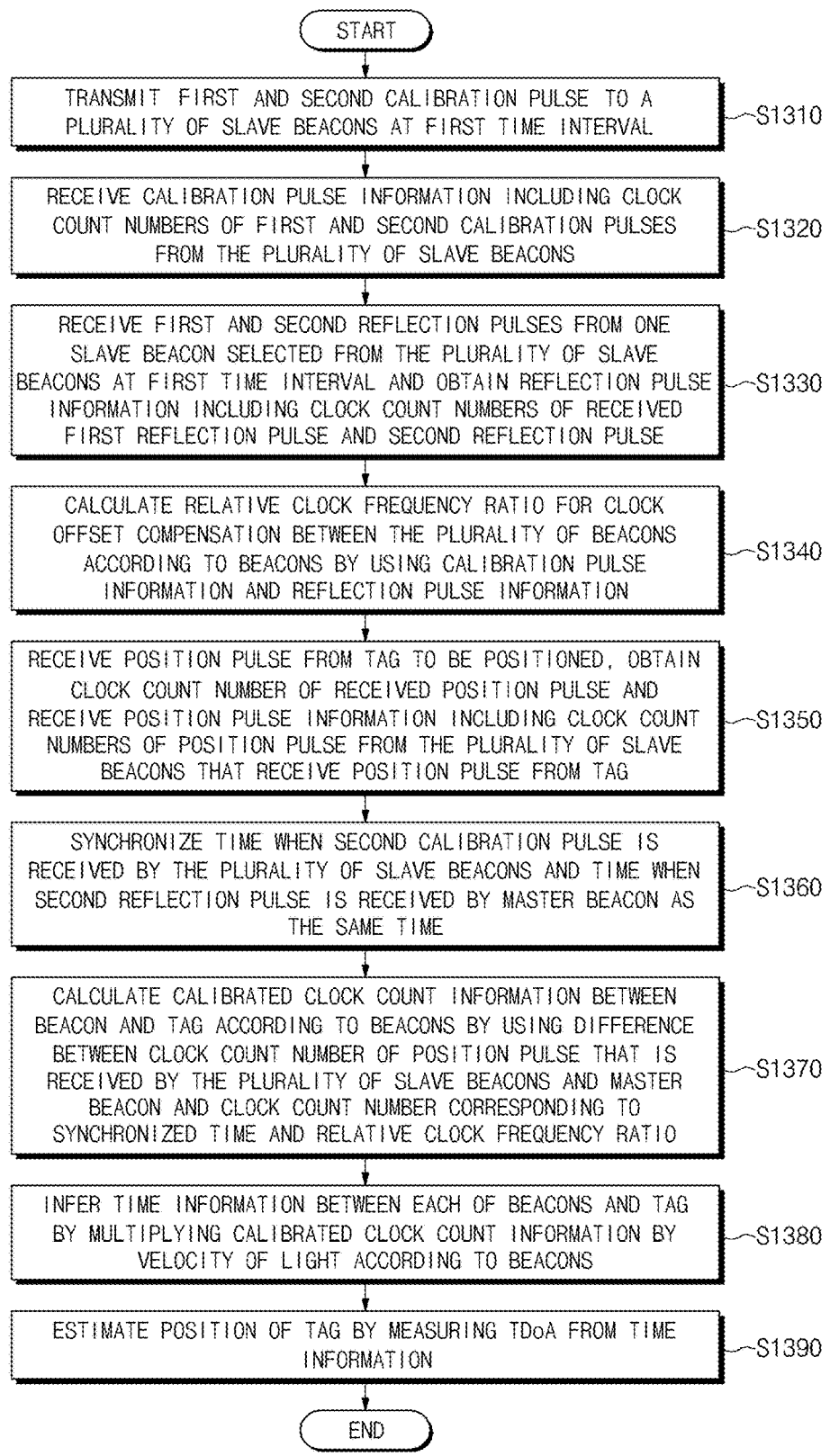
FIG. 13 illustrates a wireless positioning method using clock offset compensation at the master beacon of FIG. 11.
Figure 14:
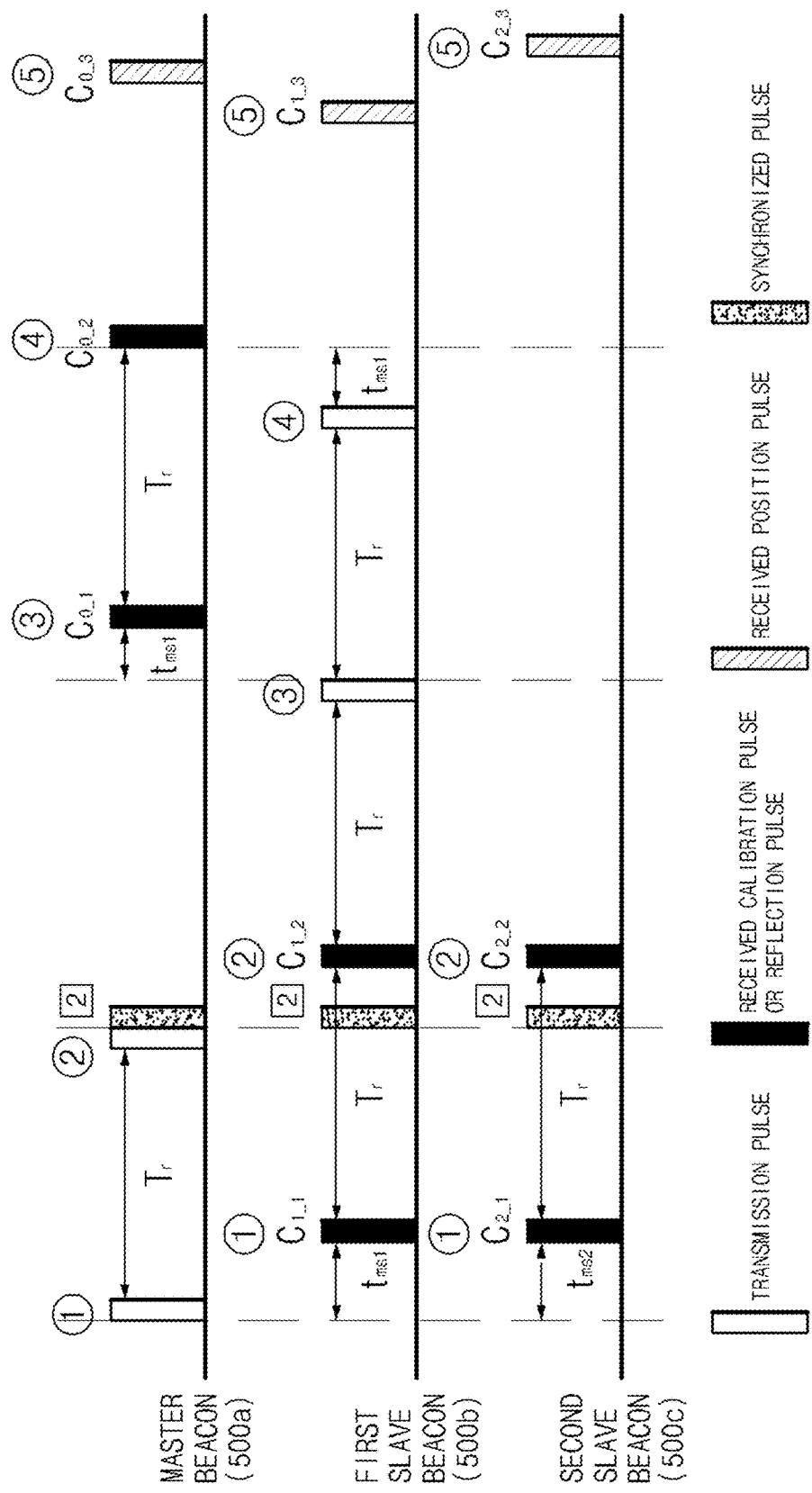
FIG. 14 is a conceptual view for explaining FIG. 13.

FIG. 13 illustrates a wireless positioning method using clock offset compensation at the master beacon of FIG. 11, and FIG. 14 is a conceptual view for explaining FIG. 13.

In FIG. 14, in case of the master beacon 500a, ① and ② are time when the first and second calibration pulses are transmitted, and ③ and ④ are time when the first and second reflection pulses are received. In case of the first slave beacon 500b, ① and ② are time when the first and second calibration pulses are received, and ③ and ④ are time when the first and second reflection pulses are transmitted. In addition, in case of the second slave beacon 500c, ① and ② are time when the first and second calibration pulses are received. In addition, in case of each of the beacons 500a, 500b, and 500c, ⑤ is time when the position pulse is received, and ▣ is a synchronized time when the second calibration pulse or the second reflection pulse is received.

First, in operation S1310, the calibration pulse information transmitting unit 510 transmits the first calibration pulse and the second calibration pulse to the plurality of slave beacons 500b and 500c at the first time interval. Referring to the master beacon 500a of FIG. 14, two transmission pulses are transmitted to times ① and ② at the first time interval $T_r$.

Next, in operation S1320, the calibration pulse information receiving unit 520 receives calibration pulse information including clock count numbers of the first and second calibration pulses from the plurality of slave beacons 500b and 500c. Referring to the slave beacons 500b and 500c of FIG. 14, the first calibration pulse and the second calibration pulse that are transmitted from the master beacon 500a, are delayed by time $t_{ms1}$ for the first slave beacon 500b and by time $t_{ms2}$ for the second slave beacon 500c (times ① and ② of FIG. 14). Here, the clock count numbers of the first and second calibration pulses that are received by the first slave beacon 500b, are $C_{1\_1}$ and $C_{1\_2}$, respectively, and the clock count numbers of the first and second calibration pulses that are received by the second slave beacon 500c, are $C_{2\_1}$ and $C_{2\_2}$ respectively.

Next, in operation S1330, the reflection pulse information obtaining unit 530 receives the first and second reflection pulses from one slave beacon 500a selected from the plurality of slave beacons 500b and 500c at the first time interval $T_r$ (times ③ and ④ of FIG. 14) and obtains reflection pulse information including the clock count numbers of the received first reflection pulse and the second reflection pulse.

Referring to FIG. 14, the master beacon 500a transmits the first and second calibration pulses to the slave beacons 500b and 500c at the first time interval $T_r$, and the first slave beacon 500b that receives the first and second calibration pulses, transmits the first and second reflection pulses to the master beacon 500a after the first time interval $T_r$ and $2T_r$ have elapsed.

That is, referring to the first slave beacon 500b of FIG. 14, the first and second reflection pulses are transmitted to the master beacon 500a at the first time interval $T_r$ after time $C_{1\_2}$ when the second calibration pulse is received by the master beacon 500a (times ③ and ④ of FIG. 14). The clock count numbers of the first and second reflection pulses that are received by the master beacon 500a, are $C_{0\_1}$ and $C_{0\_2}$, respectively. Here, the first and second reflection pulses that are transmitted from the first slave beacon 500b, are received with being delayed by time $t_{ms1}$.

Next, in operation S1340, the clock offset calibration unit 540 calculates a relative clock frequency ratio $f_i$ for clock offset compensation between the plurality of beacons 500a, 500b, and 500c according to the beacons 500a, 500b, and 500c by using calibration pulse information $C_{1\_1}$, $C_{1\_2}$, $C_{2\_1}$, and $C_{2\_2}$ and reflection pulse information $C_{0\_1}$ and $C_{0\_2}$ by using Equation 6:

$$f_i = \frac{C_{i\_2} - C_{i\_1}}{C_{0\_2} - C_{0\_1}} \text{ for } i = 0, 1, 2, \qquad \text{[Equation 6]}$$

where $f_i$ is a relative clock frequency ratio of an i-th beacon, $C_{0\_1}$ and $C_{0\_2}$ are clock count numbers of the first and second reflection pulses that are measured by the master beacon 500a, and $C_{i\_1}$ and $C_{i\_2}$ are clock count numbers of the first and second calibration pulses that are received by the plurality of slave beacons 500b and 500c (i=1, 2). Equation 6 is the same as Equation 2 described above, and thus detailed description thereof will be omitted.

After operation S1340, in operation S1350, the position pulse information receiving unit 550 receives the position pulse from the tag 600 to be positioned (time ⑤ of FIG. 14), obtains a clock count number $C_{0\_3}$ of the received position pulse, and receives position pulse information including clock count numbers $C_{1\_3}$ and $C_{2\_3}$ of the position pulse from the plurality of slave beacons 500b and 500c that receive the position pulse from the tag 600.

Next, in operation S1360, the receiving time synchronization unit 560 synchronizes time when the second calibration pulse is received by the plurality of slave beacons 500b and 500c and time when the second reflection pulse is received by the master beacon 500a as the same time (time ② of FIG. 14). Since the time when the second calibration pulse is received by the slave beacons 500b and 500c (2 of FIG. 14) and the time when the second reflection pulse is received by the master beacon 500a (④ of FIG. 14) are the same, as illustrated in FIG. 14, in the present embodiment, an operation of synchronizing the times as the same time (time ② of FIG. 14) is performed.

Next, in operation S1370, the clock count calibration unit 570 calculates calibrated clock count information between the beacon 500 and the tag 600 according to the beacons 500a, 500b, and 500c by using a difference between the clock count number $C_{i\_3}$ of the position pulse that is received by the plurality of slave beacons 500b and 500c and the master beacon 500a and a clock count number corresponding to the synchronized time, and the relative clock frequency ratio.

That is, in operation S1370, clock count information including an offset between the tag 600 and each of the beacons 500a, 500b, and 500c is calibrated by using $f_i$ calculated in Equation 6 and the clock count numbers of the pulses.

Calculation of the calibrated clock count information is classified into two cases, as in FIG. 1, that is, a first case ($C_{i\_2} < C_{i\_3}$) where the clock count number $C_{i\_2}$ of the second calibration pulse or the second reflection pulse that is received by the i-th beacon (beacon i) is less than the clock count number $C_{i\_2}$ and a second case ($C_{i\_2} \geq C_{i\_3}$) where the clock count number $C_{i\_2}$ of the second calibration pulse or the second reflection pulse that is received by the i-th beacon (beacon i) is equal to or grater than the clock count number $C_{i\_3}$.

First, when $C_{i\_2} < C_{i\_3}$ (first case), the calibrated clock count information $C_i$ (i=0) for the master beacon 500a and the calibrated clock count information $C_i$ (otherwise, i=1, 2) for the plurality of slave beacons 500b and 500c are calculated using Equation 7:

$$\text{if } i=0, \quad C_i = \frac{C_{i\_3} - (C_{i\_2} - 2(T_r + t_{msi}) \times f_i) + \left\lfloor \frac{T_{i\_32}}{T_c} \right\rfloor \times C_{max}}{f_i} \quad \text{[Equation 7]}$$

$$\text{otherwise, } C_i = \frac{C_{i\_3} - (C_{i\_2} - t_{msi} \times f_i) + \left\lfloor \frac{T_{i\_32}}{T_c} \right\rfloor \times C_{max}}{f_i},$$

where $C_i$ is calibrated clock count information of the i-th beacon, $T_r$ is the first time interval, $T_{i\_32}$ is a difference between time when the second calibration pulse (or the second reflection pulse) is received by the i-th beacon and time when the position pulse is received by the i-th beacon, $T_c$ is a clock one period, and $C_{max}$ is a maximum number of clock count during the clock one period and corresponds to a preset value. Like in FIG. 1, $C_{max}$ may correspond to $2^{32}-1$.

$t_{ms1}$ is time when the master beacon (i=0) transmits the first calibration pulse and then the first slave beacon (i=1) receives the first calibration pulse, which is the same as time when the first slave beacon (i=1) transmits the first reflection pulse and then the master beacon (i=0) receives the first reflection pulse. Thus, $t_{ms0}$ and $t_{ms1}$ are the same time and is indicated by $t_{ms1}$ in FIG. 14. In addition, $t_{ms1}$ is the same as a time interval between time when the second calibration pulse is received by the first slave beacon (i=1) (time ②) of the first slave beacon 500b in FIG. 14) and the synchronized time (time ② of FIG. 14).

Likewise, $t_{ms2}$ is time when the master beacon (i=0) transmits the first calibration pulse and then the second slave beacon (i=2) receives the first calibration pulse, which is the same as a time interval between time when the second slave beacon (i=2) receives the second calibration pulse (time ② of the second slave beacon 500c in FIG. 14) and the synchronized time (time ② of FIG. 14).

As shown in Equation 7, in case of the master beacon (i=0), $C_{i\_3} - (C_{i\_2} - 2(T_r + t_{msi}) \times f_i)$ is a clock count number corresponding to time between the receiving time of the position pulse (time ⑤ of the master beacon 500a in FIG. 14) and the synchronized receiving time (time ②) of the second reflection pulse. The value ⌊ ⌋ of Equation 7 is determined according to the sizes of $T_{i\_32}$ and $T_c$, and detailed description thereof has been shown in Equation 3 and thus will be omitted.

In case of the slave beacons 500b and 500c (otherwise), $C_{i\_3} - (C_{i\_2} - t_{msi} \times f_i)$ corresponds to a clock count number corresponding time between the receiving time of the position pulse (time ⑤ of the slave beacons 500b and 500c) and the synchronized receiving time of the second reflection pulse (time ②) of FIG. 14.

Next, when $C_{i\_2} \geq C_{i\_3}$ (second case), the calibrated clock count information $C_i$ (i=0) for the master beacon 500a and the calibrated clock count information $C_i$ (i=1, 2) for the plurality of slave beacons 500b and 500c by using Equation 8:

$$\text{if } i=0, C_i = \frac{(C_{i\_3} + C_{max} + 1) - (C_{i\_2} - 2(T_r + T_{msi}) \times f_i) + \left\lfloor \frac{T_{i\_32}}{T_c} \right\rfloor \times C_{max}}{f_i} \quad \text{[Equation 8]}$$

$$\text{otherwise, } C_i = \frac{(C_{i\_3} + C_{max} + 1) - (C_{i\_2} - t_{msi} \times f_i) + \left\lfloor \frac{T_{i\_32}}{T_c} \right\rfloor \times C_{max}}{f_i},$$

where the definition of factors is the same as in Equation 7 and thus will be omitted.

A clock counter performs an operation of counting from 0 to $C_{max}$ repeatedly. In this case, $C_{i\_2}$ may be measured at the beacon before $C_{max}$, and $C_{i\_3}$ may be measured immediately after $C_{max}$. Thus, in case of $C_{2\_2} \geq C_{2\_3}$, the clock count calibration unit 570 performs an arithmetic operation in the same manner as Equation 7 after adding $C_{max}+1$ to $C_{i\_3}$, as shown in Equation 8.

After a value $C_i$ is calculated according to the beacons to be suitable for the first case ($C_{i\_2} < C_{i\_3}$) and the second case ($C_{i\_2} \geq C_{i\_3}$), as described above, in operation S1380, a positioning estimation unit (not shown) obtains time information between each of the beacons 500a, 500b, and 500c and the tag 600 by multiplying the calibrated clock count information $C_i$ by velocity of light according to the beacons 500a, 500b, and 500c. In operation S1390, the positioning estimation unit (not shown) estimates a position of the tag 600 by measuring TDoA from the obtained time information. The operation of estimating a position uses the same principle as illustrated in FIG. 1.

As described above, the embodiments illustrated in FIGS. 1 and 11 will be summarized as follows. In FIGS. 1 and 11, the relative clock offset of the beacons may be completely compensated for by using a time difference between the first calibration pulse and the second calibration pulse in a state where the calibration node or the master beacon and the slave beacons are placed at an arbitrary position in a wireless positioning environment.

Figure 15:
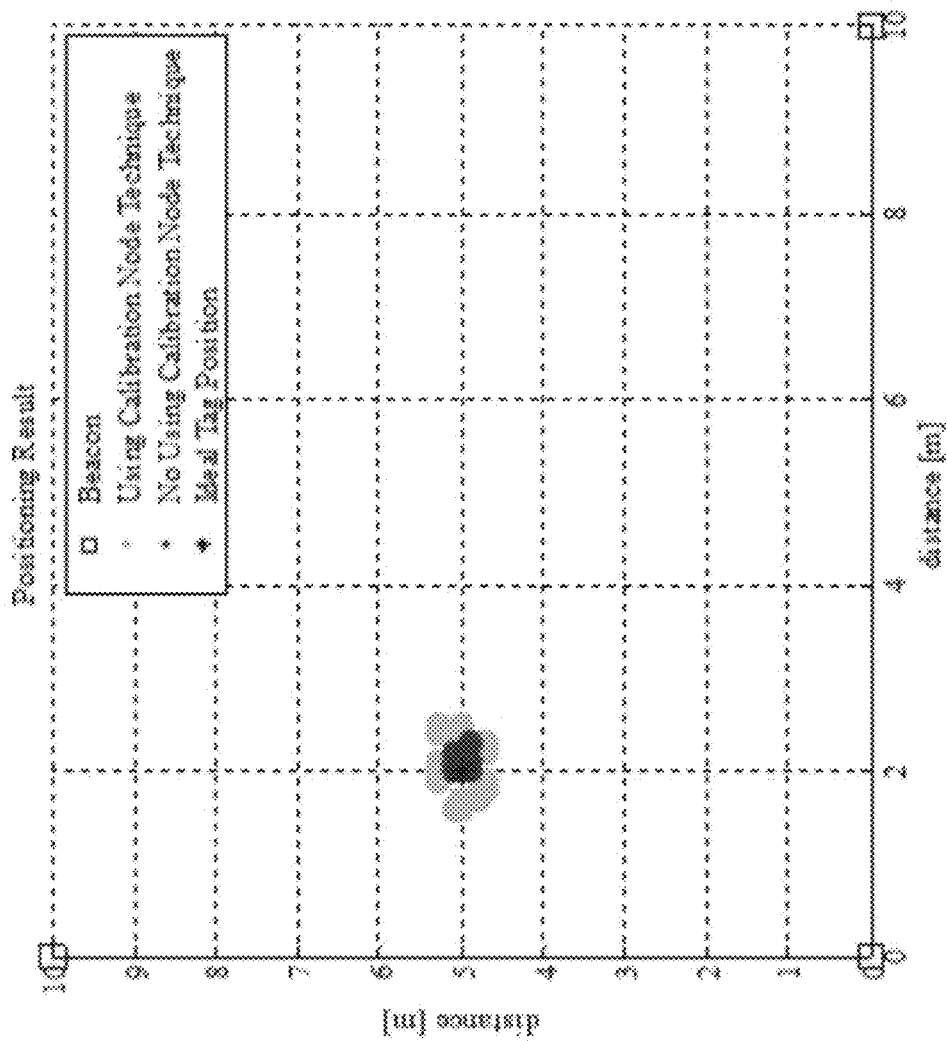
FIGS. 15 and 16 illustrate the result of wireless positioning simulation illustrated in FIGS. 1 and 11.
Figure 16:
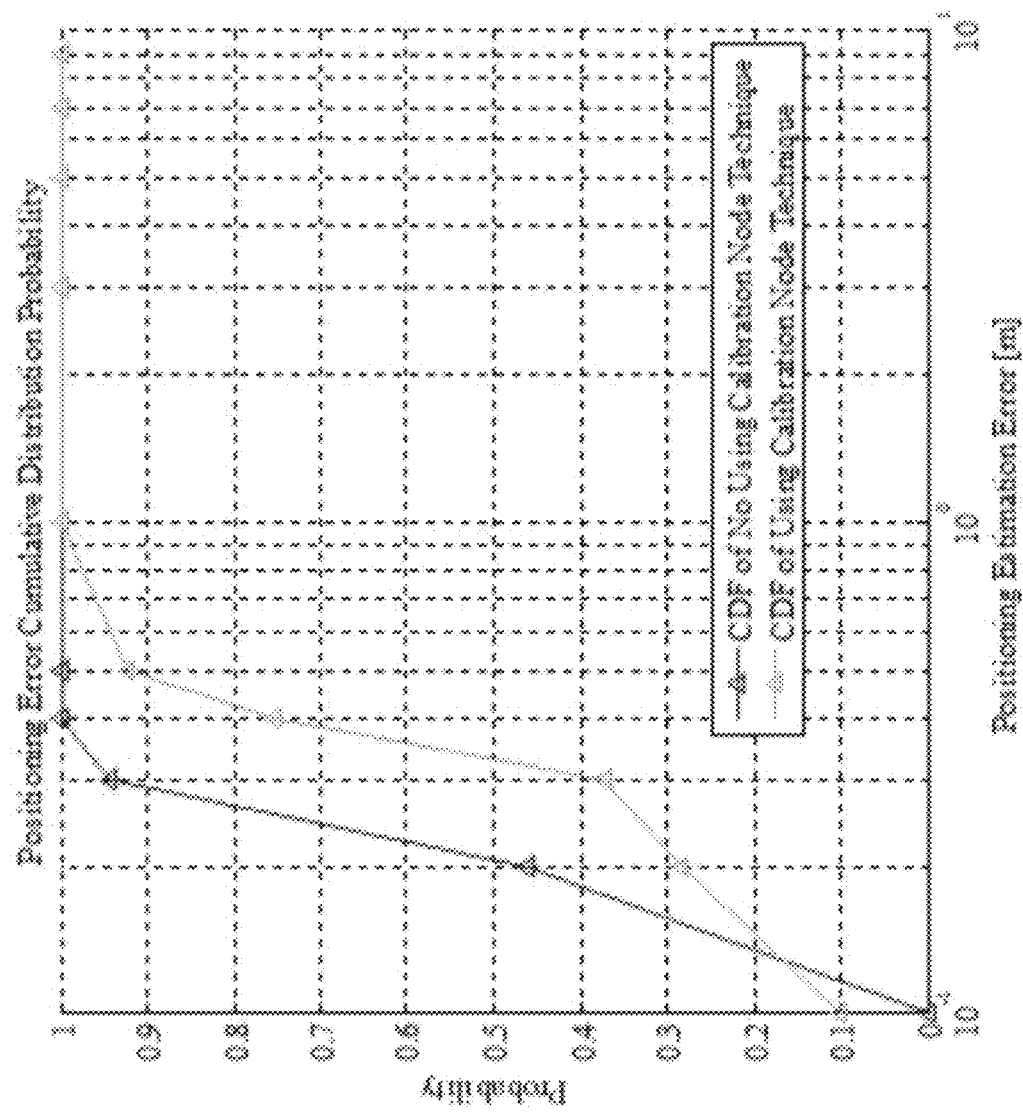

Hereinafter, the result of wireless positioning simulation by using the technique according to the present invention will be described. FIGS. 15 and 16 FIGS. 15 and 16 illustrate the result of wireless positioning simulation illustrated in FIGS. 1 and 11.

Positions indicated by rectangle (□) represent three beacon positions. Green and red positions represent results of a first embodiment (using calibration node technique) and a second embodiment (no using calibration node technique). Here, blue star position represents an ideal tag position.

The results of a distance error of FIG. 15 and an error probability of FIG. 16 in the second embodiment are better than in the first embodiment; however, the positioning result in the first embodiment is good.

As described above, according to the present invention, since the number of position pulse transmission of a tag required for positioning estimation is only once, power consumption of the tag may be minimized, and thus an operating time of the tag may be improved. In addition, in the first embodiment in which the calibration node is used, nodes do not use reflection logic because of a wireless positioning system using one way ranging (OWR). Thus, as the nodes have the simplest function, the marketability of the wireless positioning system is improved. In the second embodiment in which the calibration node is not used, system cost may be reduced; however, pulse reflection logic is required at a first slave beacon and thus the nodes become complicated and a wireless positioning result may be sensitive according to an error degree.

In addition, according to the present invention, a wireless synchronization method between beacons is presented so that the wireless positioning system may be easily installed compared to wired synchronization. Assuming that wired connection between a beacon and a server, a pulse that may collide with a positioning estimation pulse of the tag, is a calibration node or a calibration pulse of the beacon. The calibration pulse is required for only twice or four time pulse transmission at an initial stage at which the wireless positioning system is established. Thus, since there is hardly probability that the position pulse of the tag and a pulse of another node may collide with each other after the initial establishment stage, the reliability of wireless positioning of the tag may be guaranteed.

As described above, in a wireless positioning server using clock offset compensation and a wireless positioning method using the wireless positioning server according to the present invention, an error in the positioning estimation result due to a clock offset may be minimized by measuring a relative clock frequency ratio between beacons and by compensating for clock frequencies of the beacons when a distance between a beacon and a tag is estimated.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A wireless positioning server comprising:
circuitry configured to:
receive calibration pulse information comprising clock count numbers of a first calibration pulse and a second calibration pulse from a plurality of beacons that receive the first calibration pulse and the second calibration pulse at a predetermined time interval from a calibration node;
calculate a relative clock frequency ratio for clock offset compensation between each beacon of the plurality of beacons and a reference beacon of the plurality of beacons by using a difference between the clock count number of the first calibration pulse and the clock count number of the second calibration pulse for each beacon;
receive position pulse information comprising a clock count number of the position pulse from the plurality of beacons that receive a position pulse from a tag to be positioned;
synchronize a time when the second calibration pulse is received by each beacon of the plurality of beacons among the plurality of beacons by subtracting ideal clock count number information for each beacon from the clock count of the second calibration pulse for each beacon, wherein the ideal clock count number information corresponds to a distance between each beacon and the calibration node determined by using the calibration pulse information; and
calculate calibrated clock count information between the beacon and the tag according to the beacons by using a difference between the clock count number of the position pulse and a clock count number corresponding to the synchronized time and the relative clock frequency ratio.

2. The wireless positioning server of claim 1, wherein the circuitry is further configured to estimate a position of the tag by obtaining time information between each beacon and the tag, by multiplying the calibrated clock count information by velocity of light according to the beacons, and then by measuring time difference of arrival (TDoA) from the obtained time information.

3. The wireless positioning server of claim 1, wherein the relative clock frequency ratio is calculated using the following Equation:

$$f_i = \frac{C_{i\_2} - C_{i\_1}}{C_{0\_2} - C_{0\_1}} \text{ for } i = 0, 1, 2,$$

where $f_i$ is the relative clock frequency ratio of an i-th beacon, $C_{0\_1}$ and $C_{0\_2}$ are the clock count numbers of the first and second calibration pulses that are received by the reference beacon (i=0), and $C_{i\_1}$ and $C_{i\_2}$ are the clock count numbers of the first and second calibration pulses that are received by the i-th beacon.

4. The wireless positioning server of claim 3, wherein, if the clock count number $C_{i\_2}$ of the second calibration pulse that is received by the i-th beacon, is less than a clock count number $C_{i\_3}$ of the position pulse, the calibrated clock count information $C_i$ is calculated using the following Equation:

$$C_i = \frac{C_{i\_3} - (C_{i\_2} - C_{cbi}) + \left\lfloor \frac{T_{i\_32}}{T_c} \right\rfloor \times C_{max}}{f_i},$$

where $C_i$ is calibrated clock count information of the i-th beacon, $C_{cbi}$ is the ideal clock count number information for the i-th beacon, $T_{i\_32}$ is a difference between times when the second calibration pulse and the position pulse are received by the i-th beacon, $T_c$ is a clock one period, and $C_{max}$ is a maximum number of clock count during the clock one period.

5. The wireless positioning server of claim 4, wherein, if the clock count number $C_{i\_2}$ of the second calibration pulse that is received by the i-th beacon, is equal to or greater than a clock count number $C_{i\_3}$ of the position pulse, the calibrated clock count information $C_i$ is calculated using the following Equation:

$$C_i = \frac{(C_{i\_3} + C_{max} + 1) - (C_{i\_2} - c_{cbi}) + \left\lfloor \frac{T_{i\_32}}{T_c} \right\rfloor \times C_{max}}{f_i}.$$

6. The wireless positioning server of claim 3, wherein, if a difference $T_{i\_32}$ between time when the second calibration pulse is received by the i-th beacon and time when the position pulse is received is less than a clock one period $T_c$, the calibrated clock count information $C_i$ is calculated using the following Equation:

$$C_i = \frac{C_{i\_3} - (C_{i\_2} - C_{cbi})}{f_i},$$

where $C_i$ is calibrated clock count information of the i-th beacon, and $C_{cbi}$ is the ideal clock count number information for the i-th beacon.

7. The wireless positioning server of claim 3, wherein, if a difference $T_{i\_32}$ between time when the second calibration pulse is received by the i-th beacon and time when the position pulse is received is equal to or greater than a clock one period $T_c$, the calibrated clock count information $C_i$ is calculated using the following Equation:

$$C_i = \frac{C_{i\_3} - (C_{i\_2} - C_{cbi}) + \left\lfloor \frac{T_{i\_32}}{T_c} \right\rfloor \times C_{max}}{f_i},$$

where $C_i$ is calibrated clock count information of the i-th beacon, $C_{cbi}$ is the ideal clock count number information for the i-th beacon, and $C_{max}$ is a maximum number of clock count during the clock one period.

8. A wireless positioning method using clock offset compensation at a wireless positioning server, the wireless positioning method comprising:
receiving calibration pulse information comprising clock count numbers of a first calibration pulse and a second calibration pulse from a plurality of beacons that receive the first calibration pulse and the second calibration pulse at a predetermined time interval from a calibration node;
calculating a relative clock frequency ratio for clock offset compensation between each beacon of the plurality of beacons and a reference beacon of the plurality of beacons by using a difference between the clock count number of the first calibration pulse and the clock count number of the second calibration pulse for each beacon;
receiving position pulse information comprising a clock count number of the position pulse from the plurality of beacons that receive a position pulse from a tag to be positioned;
synchronizing a time when the second calibration pulse is received by each beacon of the plurality of beacons among the plurality of beacons by subtracting ideal clock count number information for each beacon from the clock count of the second calibration pulse for each beacon, wherein the ideal clock count number information corresponds to a distance between each beacon and the calibration node determined by using the calibration pulse information; and
calculating calibrated clock count information between the beacon and the tag according to the beacons by using a difference between the clock count number of the position pulse and a clock count number corresponding to the synchronized time and the relative clock frequency ratio.

9. The wireless positioning method of claim 8, further comprising:
obtaining time information between each beacon and the tag by multiplying the calibrated clock count information by velocity of light according to the beacons; and
measuring time difference of arrival (TDoA) from the obtained time information so as to estimate a position of the tag.

10. The wireless positioning method of claim 8, wherein the relative clock frequency ratio is calculated using the following Equation:

$$f_i = \frac{C_{i\_2} - C_{i\_1}}{C_{0\_2} - C_{0\_1}} \text{ for } i = 0, 1, 2,$$

where $f_i$ is the relative clock frequency ratio of an i-th beacon, $C_{0\_1}$ and $C_{0\_2}$ are clock count numbers of the first and second calibration pulses that are received by the reference beacon (i=0), and $C_{i\_1}$ and $C_{i\_2}$ are clock count numbers of the first and second calibration pulses that are received by the i-th beacon.

11. The wireless positioning method of claim 10, wherein, if the clock count number $C_{i\_2}$ of the second calibration pulse that is received by the i-th beacon, is less than a clock count number $C_{i\_3}$ of the position pulse, the calibrated clock count information $C_i$ is calculated using the following Equation:

$$C_i = \frac{C_{i\_3} - (C_{i\_2} - C_{cbi}) + \left\lfloor \frac{T_{i\_32}}{T_c} \right\rfloor \times C_{max}}{f_i},$$

where $C_i$ is calibrated clock count information of the i-th beacon, $C_{cbi}$ is the ideal clock count number information for the i-th beacon, $T_{i\_32}$ is a difference between times when the second calibration pulse and the position pulse are received by the i-th beacon, $T_c$ is a clock one period, and $C_{max}$ is a maximum number of clock count during the clock one period.

12. The wireless positioning method of claim 11, wherein, if the clock count number $C_{i\_2}$ of the second calibration pulse that is received by the i-th beacon, is equal to or greater than a clock count number $C_{i\_3}$ of the position pulse, the calibrated clock count information $C_i$ is calculated using the following Equation:

$$C_i = \frac{(C_{i\_3} + C_{max} + 1) - (C_{i\_2} - C_{cbi}) + \left\lfloor \frac{T_{i\_32}}{T_c} \right\rfloor \times C_{max}}{f_i}.$$

* * * * *